(12) United States Patent
Davis

(10) Patent No.: US 9,149,023 B2
(45) Date of Patent: Oct. 6, 2015

(54) POLE TOP EXTENSION ACCESSORIES AND METHODS OF USING SAME

(71) Applicant: Kenneth S. Davis, Fresno, CA (US)

(72) Inventor: Kenneth S. Davis, Fresno, CA (US)

( * ) Notice: Subject to any disclaimer, the term of this patent is extended or adjusted under 35 U.S.C. 154(b) by 0 days.

(21) Appl. No.: 13/841,562

(22) Filed: Mar. 15, 2013

(65) Prior Publication Data

US 2013/0213306 A1    Aug. 22, 2013

Related U.S. Application Data

(63) Continuation-in-part of application No. 13/782,380, filed on Mar. 1, 2013, which is a continuation of application No. 12/321,801, filed on Jan. 26, 2009, now Pat. No. 8,387,569.

(60) Provisional application No. 61/062,181, filed on Jan. 24, 2008.

(51) Int. Cl.
*A01K 31/12* (2006.01)

(52) U.S. Cl.
CPC ...................................... *A01K 31/12* (2013.01)

(58) Field of Classification Search
USPC ........... 119/903, 61.3, 468, 531, 537; 52/101; 174/138 E, 138 F; 47/47; 211/1.3, 197, 211/172, 85.24, 196, 205, 107, 166
See application file for complete search history.

(56) References Cited

U.S. PATENT DOCUMENTS

| | | | | |
|---|---|---|---|---|
| 121,349 A | * | 11/1871 | Fellows | 211/197 |
| 159,823 A | * | 2/1875 | Howes | 211/166 |
| 176,366 A | * | 4/1876 | Skeel | 211/196 |
| 214,485 A | * | 4/1879 | Brown et al. | 211/163 |
| 235,008 A | * | 11/1880 | Palmer | 211/166 |
| 242,799 A | * | 6/1881 | Small | 211/196 |
| 649,734 A | * | 5/1900 | Leger | 211/163 |
| 665,572 A | * | 1/1901 | Milbrath | 211/166 |
| 819,204 A | | 5/1906 | Buckingham | |
| 904,319 A | * | 11/1908 | Duncan | 211/166 |
| 1,037,111 A | | 8/1912 | Bethel | |

(Continued)

FOREIGN PATENT DOCUMENTS

GB        2150827 A   *   7/1985   ............ D06F 57/04

OTHER PUBLICATIONS

"Equipment Details," Oakhills AT&T North Network Node 001B, 2 pages (Dec. 1, 2012).

(Continued)

*Primary Examiner* — Kristen C Hayes
(74) *Attorney, Agent, or Firm* — Marcus N. DiBuduo

(57) ABSTRACT

A system for attaching to the top end of a pole, such as a power pole supporting at least one power line. The system can include an extension bracket engaged to a top end of the pole and an extension bayonet extending from said extension bracket. A raptor perch assembly can be engaged to a top end of the extension bayonet. One or more accessories, such as a wireless antenna, can be attached to the extension bayonet below the raptor perch assembly. The accessories can be engaged to the extension bayonet via one or more accessory mounting brackets. A deflecting assembly can be positioned between the raptor perch assembly and the accessory to prevent debris dropped from the raptor perch assembly from lodging on the accessory. The deflecting assembly can be engaged to the extension bayonet and/or to the raptor perch assembly.

45 Claims, 16 Drawing Sheets

(56) References Cited

U.S. PATENT DOCUMENTS

| | | | | |
|---|---|---|---|---|
| 1,232,982 | A | * | 7/1917 | Sheidt ........................... 211/209 |
| 1,420,430 | A | | 6/1922 | Jaeckle et al. |
| 1,685,663 | A | | 9/1928 | Austin |
| 1,915,752 | A | | 6/1933 | Obbard |
| 3,013,584 | A | | 12/1961 | Reed et al. |
| 3,201,834 | A | | 8/1965 | Baittinger |
| 3,310,180 | A | * | 3/1967 | Neagle ........................... 211/205 |
| 3,319,332 | A | | 5/1967 | Finger et al. |
| 3,802,206 | A | | 4/1974 | Moore et al. |
| 3,817,394 | A | | 6/1974 | Saiki |
| 3,921,949 | A | | 11/1975 | Coon |
| 4,032,244 | A | | 6/1977 | Quayle |
| 4,048,779 | A | | 9/1977 | Valenziano et al. |
| 4,074,653 | A | | 2/1978 | Pember |
| 4,092,079 | A | | 5/1978 | Swanson |
| 4,097,165 | A | | 6/1978 | Quayle |
| 4,110,943 | A | | 9/1978 | Carlson |
| 4,143,437 | A | | 3/1979 | Voykin |
| 4,359,844 | A | | 11/1982 | Hoggard et al. |
| 4,577,449 | A | | 3/1986 | Celli |
| 4,610,364 | A | * | 9/1986 | Meade ........................... 211/183 |
| 4,689,889 | A | | 9/1987 | Reeves |
| 4,735,326 | A | * | 4/1988 | Steiner ........................... 211/197 |
| 4,767,088 | A | * | 8/1988 | Fielder et al. .................. 248/121 |
| 4,830,202 | A | * | 5/1989 | Steiner ........................... 211/197 |
| 5,092,088 | A | | 3/1992 | Way |
| 5,222,344 | A | | 6/1993 | Johnson |
| 5,230,176 | A | | 7/1993 | Schomaker |
| 5,280,841 | A | * | 1/1994 | Van Deursen ................ 211/197 |
| 5,299,528 | A | | 4/1994 | Blankenship |
| 5,360,191 | A | | 11/1994 | Carson et al. |
| 5,444,951 | A | | 8/1995 | Scott et al. |
| 5,648,641 | A | | 7/1997 | Guthrie |
| 5,661,946 | A | * | 9/1997 | Davis ............................. 52/849 |
| 5,709,057 | A | | 1/1998 | Johnson, Jr. et al. |
| 6,257,537 | B1 | | 7/2001 | Williams |
| 6,402,107 | B1 | | 6/2002 | Chervick et al. |
| 6,640,506 | B2 | | 11/2003 | Landers |
| 7,196,265 | B2 | | 3/2007 | Spencer |
| 2005/0034884 | A1 | | 2/2005 | Lee |
| 2010/0263302 | A1 | | 10/2010 | Lynch |

OTHER PUBLICATIONS

Photographs from 2008~2009.
Drawing from Dec. 1, 2012.
Avian Power Line Interaction Committee (APLIC), 2006; Suggested Practices for Avian Protection on Power Lines: The State of the Art in 2006; Edison Electric Institute, APLIC, and the California Energy Commission; Washington, D. C. and Sacramento, CA; Chapter 6.
The Edison Electric Institute's Avian Power Line Interaction Committee (APLIC) and U.S. Fish and Wildlife Service (USFWS), Apr. 2005; Avian Protection Plan (APP) Guidelines; pp. 43-44, 62-63.
Declaration of Kenneth Davis, and accompanying exhibits, submitted on Mar. 20, 1997 in connection with U.S. Appl. No. 08/628,099.
"Highline Case History: Fiberglass Utility Poletop Extensions," Highline Products Corporation: Old Saybrook, CT, 5 pages.
Photographs of Highline Fiberglass Utility Poletop Extension, Dec. 1996.
Photograph of Pole Top Extension, Dec. 1996.
"Pole Top Extension for Wood Poles," Department of Engineering, Pacific Gas and Electric Company: San Francisco, CA, 2 pages (Sep. 8, 1952).
"Electronic Distribution", Pacific Gas and Electric, Information Bulletin No. 95-PTE, Sep. 27, 1995.
"Pole Top Extension for Wood Poles", Pacific Gas and Electric, Engineering Standard 028691, Sep. 26, 1995.
Letter from San Diego Gas and Electric to George Davis, Oct. 2, 1996.
Letter from San Diego Gas and Electric to George Davis, Undated.
Photograph of Pole Top Extension, Undated.

* cited by examiner

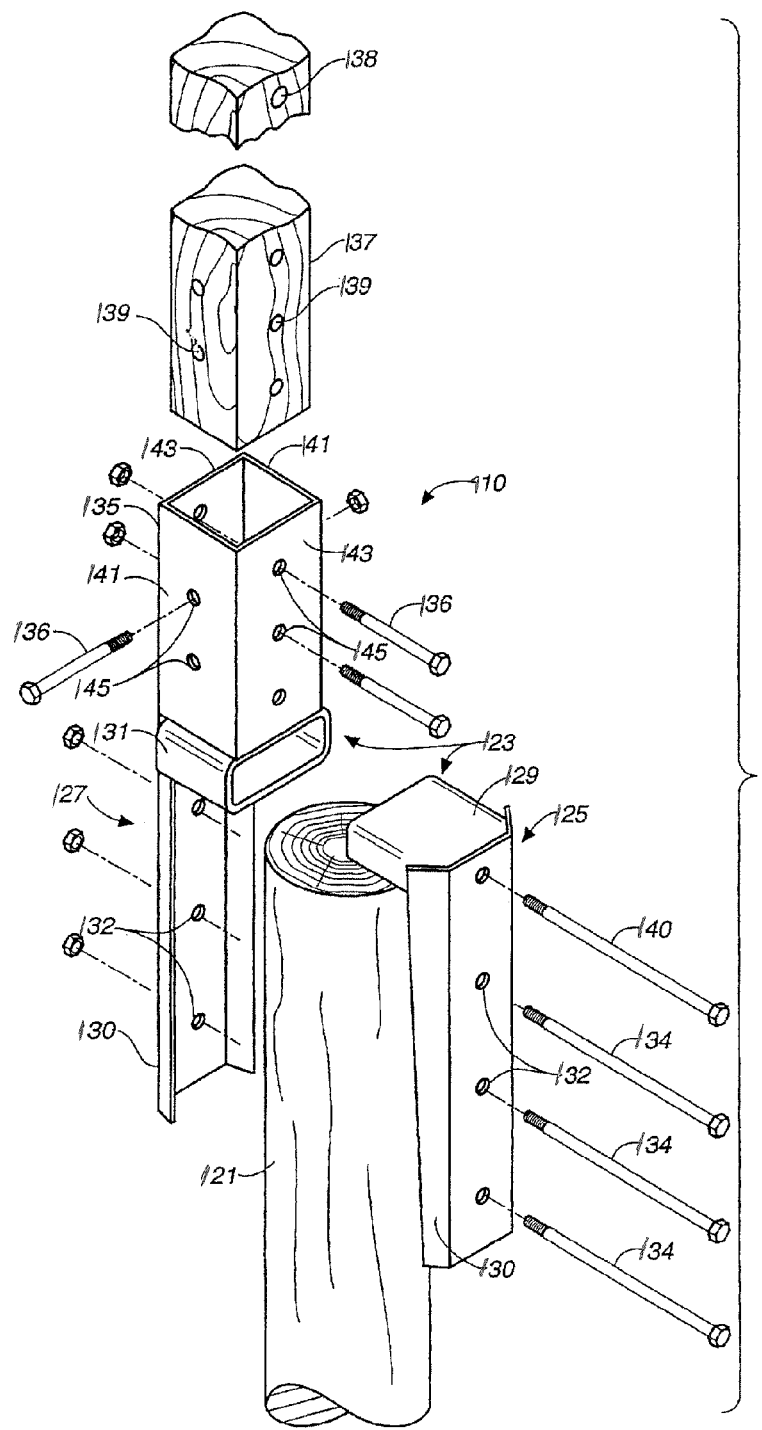
FIG._7

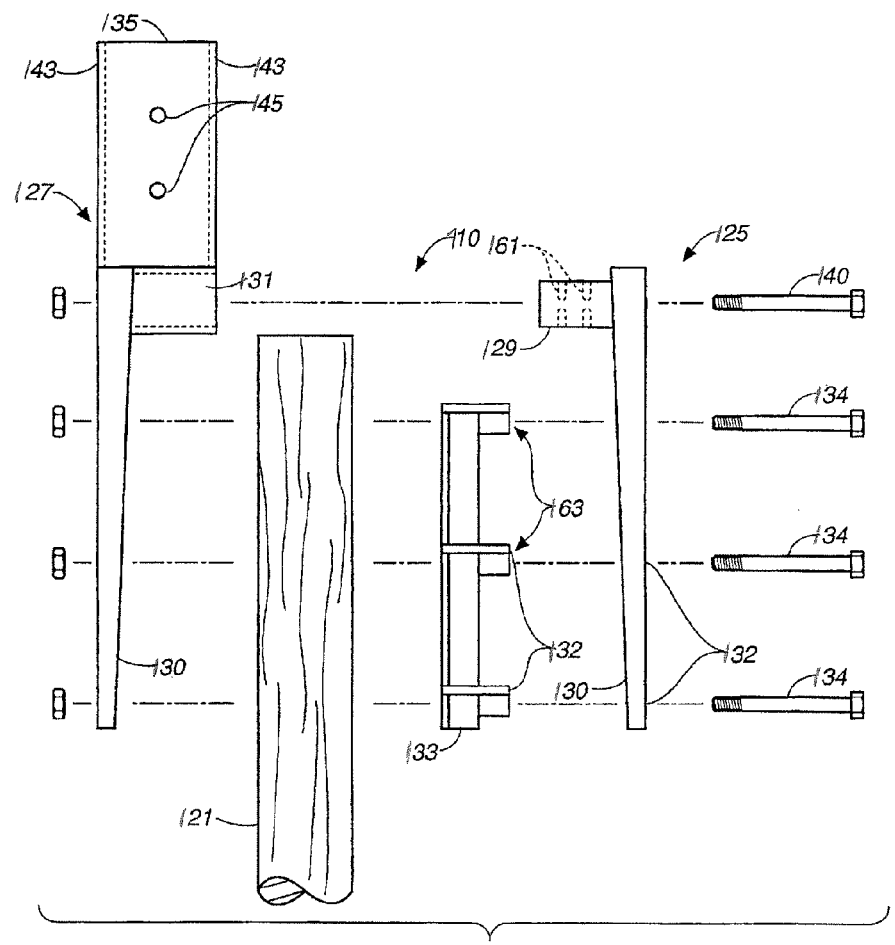
FIG._8
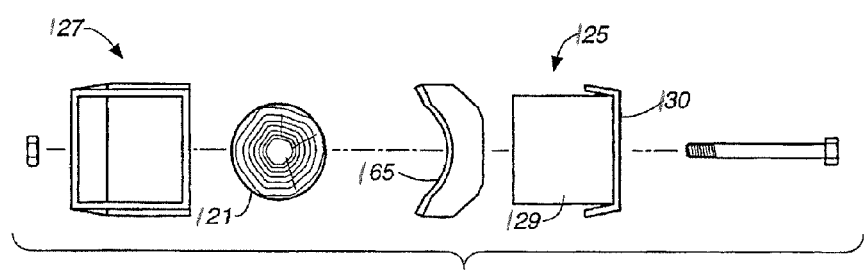
FIG._9

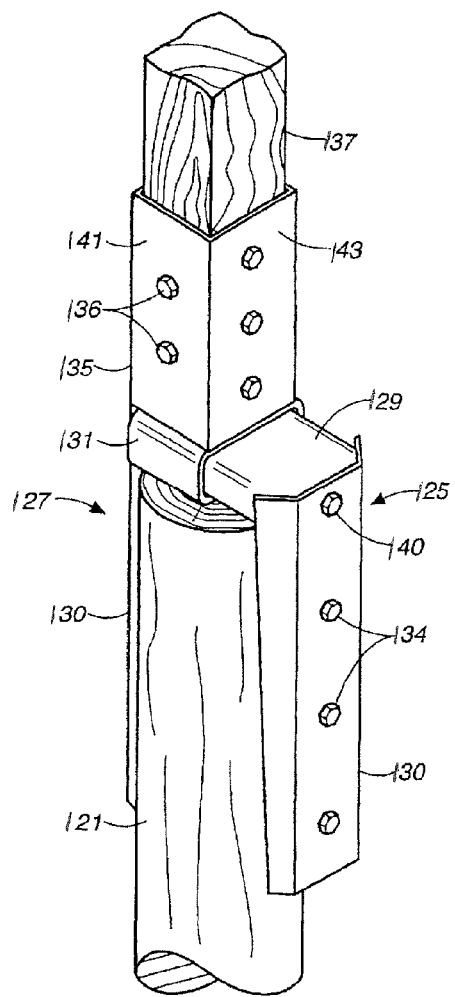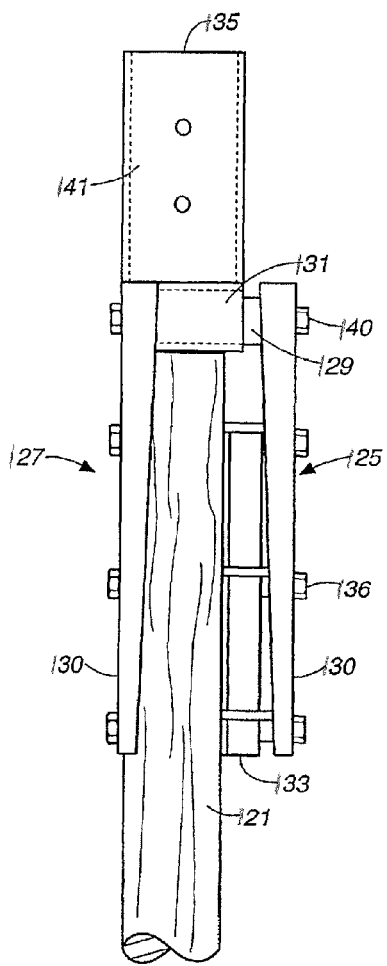
FIG._10  FIG._11
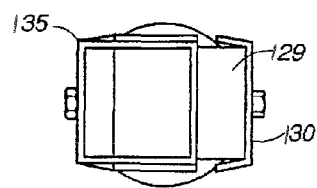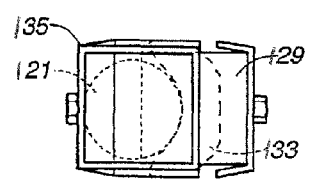
FIG._12  FIG._13

POLE TOP EXTENSION ACCESSORIES AND METHODS OF USING SAME

CROSS-REFERENCE TO RELATED APPLICATIONS

This patent application is a continuation in part of U.S. patent application Ser. No. 13/782,380, filed Mar. 1, 2013, which is a continuation of U.S. patent application Ser. No. 12/321,801, filed on Jan. 26, 2009, now patented as U.S. Pat. No. 8,387,569, each of which are incorporated herein by this reference, which claims priority to U.S. Provisional Patent Application No. 61/062,181 filed Jan. 24, 2008.

BACKGROUND OF THE INVENTION

A. Field of the Invention

The field of the present invention relates generally to apparatuses and systems for supporting and protecting birds that rest or nest on power poles or the like. In particular, the present invention relates to such apparatuses and systems that are beneficially configured as perches for birds of prey that rest and form nests on electrical power poles having one or more electrical power lines. Even more particularly, this invention relates to such apparatuses and systems that allow the birds of prey to perch and form nests safely above the power lines to avoid injury to the birds and damage to the power lines or electrical system. In some aspects, a system can include a raptor perch assembly engaged at top end of an extension bayonet, the bayonet of which is attached at a top end of a pole. The extension bayonet may have one or more accessories mounted on the extension bayonet and below the raptor perch assembly, and in some aspects, a deflecting assembly can be provided below the raptor perch assembly to deflect debris away from the accessories.

B. Background

Power lines cross the United States and many countries delivering electrical power to many millions of people. These power lines are typically supported above the ground by power poles that have a lower end inserted into the ground and an upper end having one or more cross-members which extend outwardly from the power pole to support power lines that run generally parallel on both sides of the power pole. Very often these power poles become places for birds to perch. Large birds of prey, which are also known as raptors, commonly utilize the upper portion of power poles to perch while they search for food and as a location to form their nests. Unfortunately, while entering or exiting the perch area the raptor's wings can touch the power lines and result in electrocution of the raptor and interference of the delivery of electricity along the power lines. As well known in the electrical industry, this is a particular problem for the larger sized raptors, such as eagles and hawks, that can have very wide wingspans. Many of these raptors, some of which are endangered species, are protected by federal and state laws that require electrical utility companies and others to take affirmative action to protect the birds and impose civil and/or criminal penalties on persons who injure or kill one of the protected birds. Some species of raptors are also protected under one more international treaties.

In addition to harm to the raptors that arises from contacting the power lines, contact by raptors and the nests formed by the raptors, particularly the larger raptors, can interfere with the steady delivery of electricity by the utility company. As a result of the need to protect the birds and to ensure reliable electricity supply, electrical power crews commonly climb or otherwise get to the top of a power pole and remove raptor nests in an effort to protect the raptors from harm and to improve delivery of electricity along the power lines. The work of removing nests can be hazardous to the raptors, if not done properly, and can cause injury to the crews who do the work. In addition, the labor and material costs to remove raptor nests on a regular basis and to repair damage to electrical supply systems caused by raptors can be somewhat substantial for a utility company or others, including government agencies, whose responsibility is to protect the raptors and provide electricity.

A number of prior art systems are available for protecting birds or other animals from contacting power lines so as to protect the animal from injury and prevent disruption of electricity supply. For instance, U.S. Pat. No. 5,299,528 to Blankenship describes a raptor protection unit for use on a power pole comprising a clamp system that attaches to a power pole cross-member and supports a perch above the cross-member and power lines. The clamp system has a L-shaped side-lock that exerts pressure against a stationary C-shaped brace that braces against the top, a side and the bottom of the cross-member. A perch and/or a perch guard, which prevents the raptor from perching on the cross-member, are attached to the side-lock clamps. The perch shown and described is not suitable for nesting. The Blankenship patent also describes a raptor guard by Pacer Industries that attaches to the power pole cross-member with a pair of opposing clamp members to support a perch guard devoid of horizontal outside edges, to prevent perching thereon, above the cross-member to discourage birds from landing on the cross-member. U.S. Pat. No. 7,196,265 to Spencer describes a raptor guard system comprising a saddle that fits over a power pole cross-member to support an X-shaped deterrent extension in an upwardly protruding relation to the cross-member to deter raptors, both physically and visually, from perching or nesting on the cross-member. U.S. Pat. No. 6,257,537 to Williams and U.S. Pat. No. 6,402,107 to Chervick, et al., both of which were assigned at issue to Falcon Enterprises, LLC of Evanston, Wyo., describe a mounting bracket and raptor perch guard that comprises a clamp which attaches to a cross-member or other structural member of a power pole and a perch guard that attaches to the top of the clamp. The clamps utilize self-closing brackets that have a lower member which rotatably attaches to an upper member to engage the cross-member therein. The perch guard is a generally triangular-shaped structure that is configured to prevent a bird from landing on the cross-member or extending its wingspan in a manner that contacts adjacent electrical insulators or the like. U.S. Pat. No. 4,359,844 to Hoggard, et al. describes a bird protection apparatus having a clamp that clamps to the cross-member to support a perch guard that is similarly configured to the Falcon Enterprises patents described above. U.S. Pat. No. 6,640,506 to Landers describes a bird deterrent apparatus that comprises a tubular-shaped base which attaches to the top of a pole, a post which extends upward from the base and a plurality of moveable, spaced apart fingers that extend downwardly from the top of the post to prevent birds from roosting on the pole.

While the foregoing prior art raptor perch systems and perch guards have had some success in reducing injuries to and the killing of raptors and other birds, they are generally not useful for the raptor to safely nest on the power pole. As known to those skilled in the art, in many areas power poles (despite their present danger) is the safest place for raptors to perch and nest due to the height above the ground and the ability to survey the nearby area for mice and other food. Each of the prior art raptor perch systems or perch guards, except that described in the Landers patent, attach to the cross-member of the power pole, which often does not safely allow a larger sized raptor to perch on the power pole. The prior art patents that merely deter birds from landing and roosting, including the Landers patent, do not address the need for a safe location for the raptors to perch and/or nest. What is needed, therefore, is an improved raptor perch system that allows raptors to safely perch and nest on electrical power poles. The preferred raptor perch system should be configured to position the perch and/or nesting area safely above the power lines and other electrically charged components on the power pole. Preferably, such as systems is easily adapted to existing power poles, is relatively inexpensive to manufacture and relatively easy to install.

In some instances, it may be desirable to place accessories (such as one or more cellular tower antennas) above a power pole. However, such conventional accessories—when placed at such a high altitude—may also be a desirable place for raptors to perch upon. For example, raptors have been known to perch in between antennas of a triangularly configured cellular tower. U.S. Pat. No. 8,387,569 discloses providing a raptor perch on top of an extension bayonet that is attached to a power pole. What is additionally needed, and what is provided by some embodiments of the present invention, is a system for attaching accessories to the extension bayonet and below the raptor perch. This enables accessories to be placed above a power pole but simultaneously prevents raptors from perching on such accessories. It is also believed that raptors, when constructing or using a perch in accordance with U.S. Pat. No. 8,387,569, may drop debris (for example, nesting material such as twig, fecal matter, or any other matter) from its perch. Thus, also needed is a deflector that prevents debris from lodging in or near such accessories mounted below the raptor perch assembly.

SUMMARY OF THE INVENTION

In some aspects of the invention, a system for use with a pole can include: an extension bracket assembly for engaging a distal end of the pole; an extension bayonet having a proximal end engaged with the bracket assembly; a perch assembly having a hub bracket and one or more support member extending outwardly from the hub bracket, the hub bracket having a center member engaged with a distal end of the extension bayonet; and an accessory assembly engaged to the extension bayonet between the perch assembly and the extension bracket assembly. The pole can support a power line. The accessory assembly can further include one or more radially extending arms for engagement to an accessory.

The accessory assembly can include a center member having a center cavity receiving the extension bayonet. The center member can completely circumscribe the extension bayonet. The accessory assembly center member can include one or more apertures, and the accessory assembly can further include one or more fasteners transversely extending through the extension bayonet and the accessory assembly center member apertures, for securing the accessory assembly center member to the extension bayonet. The accessory assembly center member can further include a plurality of apertures and the accessory assembly can further include a plurality of fasteners.

The accessory assembly can further include one or more securing members, each the securing members having a center cavity receiving the extension bayonet and positioned adjacent to the accessory assembly center member. The accessory assembly securing member can include one or more apertures, and the accessory assembly can further include one or more fasteners transversely extending through the extension bayonet and the accessory assembly securing member apertures, for securing the accessory assembly securing member to the extension bayonet.

The accessory assembly center member can include an inner member, the center member center cavity of which is in the inner member, and an outer member surrounding at least a portion of the inner member. The inner member can include one or more apertures, and the accessory mounting assembly can further include one or more fastener transversely extending through the extension bayonet and inner member apertures, for securing the inner member to the extension bayonet. The outer member can be rotatable relative to the inner member. The inner member can include a plurality of portions, each portion having an inner flat surface for abuttingly engaging a side of the extension bayonet, and a rounded outer surface. The outer member can include a plurality of portions, each portion having an inner rounded surface for abuttingly engaging the rounded outer surface of one or more of the inner member portions.

In some embodiments, the system can include a deflecting assembly having a hub bracket and one or more deflector panels extending outwardly from the hub bracket, the deflecting assembly between the perch assembly and the accessory assembly. The deflecting assembly hub bracket may include a center member having a center cavity receiving the extension bayonet. The deflecting assembly center member may include one or more apertures, the deflecting assembly may further include one or more fasteners transversely extending through the extension bayonet and the deflecting assembly center member apertures, for securing the deflecting assembly center member to the extension bayonet.

The deflecting assembly hub bracket can include a center member having a center cavity receiving a portion of the perch assembly hub bracket. Each the perch assembly center member and the deflecting assembly center member can include an aperture, and the system can further include at a fastener transversely extending through the deflecting assembly center member aperture, the perch assembly center member aperture, and the extension bayonet, for securing the deflecting assembly center member and the perch assembly center member to the extension bayonet. The deflecting assembly can further include one or more vertical support members engaged to the perch assembly.

The perch assembly hub bracket can further include a plurality of support brackets, and the perch assembly can further include a plurality of lateral support members, each the lateral support members having a proximal end for engaging one of the support brackets and extending outwardly therefrom.

One or more wires can engage distal ends of each of the lateral support members of the perch assembly. A plurality of cap members may engage a distal end of one of the lateral support members of the perch assembly.

In some aspects of the invention, a raptor perch system for a pole supporting one or more power line can include: an extension bracket assembly for engaging a distal end of the pole; an extension bayonet having a proximal end for engaging the bracket assembly; a raptor perch assembly having a hub bracket for engaging a distal end of the extension bayonet and one or more lateral support members extending outwardly from the hub bracket; and a deflecting assembly having a hub bracket and one or more deflector panels extending outwardly from the hub bracket. The deflecting assembly can be between the raptor perch assembly and the extension bracket.

In some implementations, the deflecting assembly hub bracket can be engaged with the extension bayonet. The deflecting assembly hub bracket can include a center member having a center cavity receiving the extension bayonet. The deflecting assembly center member can include one or more apertures, and the deflecting assembly can further include one or more fasteners for transversely extending through the extension bayonet and the deflecting assembly center member apertures.

In some implementations, the deflecting assembly hub bracket can be engaged with the raptor perch assembly hub bracket. The raptor perch assembly hub bracket can include a center member having a center cavity receiving the extension bayonet. The deflecting assembly hub bracket can include a center member having a center cavity, wherein the center cavity of the deflecting assembly center member has an internal diameter that is greater than an internal diameter of the raptor perch assembly center member. The deflecting assembly center member and the raptor perch assembly center member can include an aperture. One or more fasteners can transversely extend through the deflecting assembly center member aperture, the raptor perch assembly center member aperture, and the extension bayonet.

The deflecting assembly can further include a plurality of lateral support members. The deflecting assembly can further include one or more vertical support members engaged to the deflecting assembly lateral support members and one or more of the raptor perch assembly lateral support members. The deflecting assembly lateral support members and the raptor perch assembly lateral support members can include attaching members on distal ends thereof. The attaching members may include a ring, and the vertical support members may include a wire.

In some aspects of the invention, a system can include: a pole supporting one or more power lines; an extension bracket assembly having a collar and at least two bracket members, each bracket member having a leg portion extending circumferentially partially around a distal end of the pole; an extension bayonet having a proximal end engaging the collar of the bracket assembly; a raptor perch assembly; a deflecting assembly; and an accessory assembly having a hub bracket engaged to the extension bayonet. The accessory assembly can be between the extension bracket and the raptor perch assembly. The deflecting assembly can be between the accessory assembly and the raptor perch assembly The raptor perch assembly can include (i) a hub bracket engaging a distal end of the extension bayonet, (ii) a plurality of lateral support members extending outwardly from the hub bracket, and (iii) one or more distal support member engaged with distal ends of each of the lateral support members.

The deflecting assembly can include (i) a hub bracket, (ii) a plurality of lateral support members extending outwardly from the hub bracket, and (iii) a plurality of vertical support members, each the vertical support members engaged with one of the lateral support members, and (iv) one or more deflector panels extending outwardly from the hub bracket and engaged with one or more of the lateral support members.

The deflecting assembly hub bracket can be engaged to the extension bayonet. The deflecting assembly hub bracket can be engaged to the raptor perch assembly hub bracket. The deflecting assembly vertical support members can further engage one of the raptor perch assembly lateral support members. The deflecting assembly vertical support members can further engage one of the raptor perch assembly distal support members.

These and other objects, advantages and features of the invention, together with the organization and manner of operation thereof, will become apparent from the following detailed description when taken in conjunction with the accompanying drawings, wherein like elements have like numerals throughout the several drawings described herein.

BRIEF DESCRIPTION OF THE DRAWINGS

FIG. 7 is an exploded perspective view of a pole top extension assembly constructed in accordance with the present invention.

FIG. 8 is an exploded, side elevational view of a pole top extension assembly having a spacer member constructed in accordance with the present invention.

FIG. 9 is an exploded plan view of a pole top extension assembly having a spacer member constructed in accordance with the present invention.

FIG. 10 is a perspective view of a pole top extension assembly constructed in accordance with the present invention.

FIG. 11 is a side elevational view of a pole top extension assembly having a spacer constructed in accordance with the present invention.

FIG. 12 is a top plan view of a pole top extension assembly constructed in accordance with the present invention.

FIG. 13 is a top plan view of a pole top extension assembly having a spacer constructed in accordance with the present invention.

DETAILED DESCRIPTION OF THE PREFERRED EMBODIMENTS

Figure 1:
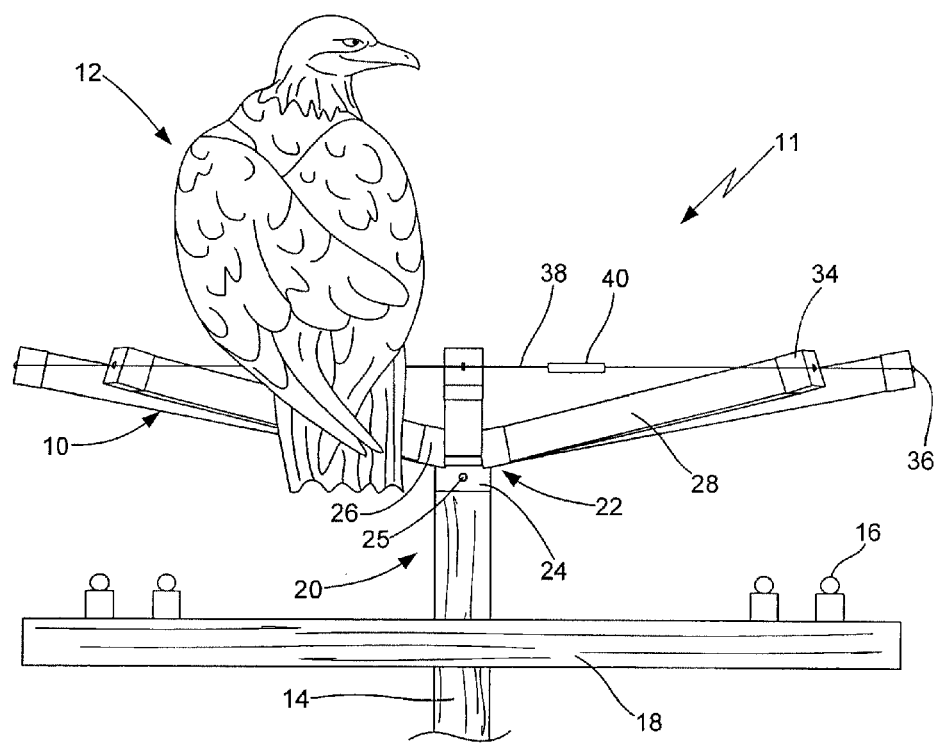
FIG. 1 is a side view a raptor perch system configured according to some embodiments of the present invention, with a raptor perch apparatus attached to the top end of a power pole shown with a raptor perched on the raptor perch apparatus.

The invention, in its various aspects, will be explained in greater detail below. While the invention will be described in conjunction with several exemplary embodiments, the exemplary embodiments themselves do not limit the scope of the invention. Similarly, the exemplary illustrations in the accompanying drawings, where like elements have like numerals, do not limit the scope of the exemplary embodiments and/or invention. Rather the invention, as defined by the exemplary claims, may cover alternatives, modifications, and/or equivalents of the exemplary embodiments.

Exemplary Raptor Perches

In some aspects the invention concerns a raptor perch apparatus for use at the top of a power pole for raptors to perch and nest without contacting the power lines supported by the power pole. In a preferred embodiment, the apparatus comprises a hub bracket having a center member received over the top of the power pole and a plurality of socket-like lateral brackets extending outwardly from the center member to support a plurality of lateral support members extending outwardly from the pole, preferably at a slight upward angle. The proximal end of the lateral support members is received in the lateral brackets. A guy wire or the like is received through a ring member on an end cap at the distal end of each lateral support member to circumvent the distal ends thereof. If needed, a pole top extension can be used to raise the apparatus above the top of the power pole.

The improved raptor perch apparatus and system of the present invention provides the benefits and solves the problems identified above. That is to say, the present invention discloses a raptor perch apparatus and system that is specifically configured to allow raptors to safely perch and nest at the top of a power pole above the power lines supported by the cross-members. As set forth in more detail below, the raptor perch apparatus of the present invention provides a place for a raptor to perch and form a nest above electrical power lines in a manner that substantially reduces the likelihood the raptor will contact the power lines while entering or leaving the perch area and substantially reduces the likelihood that the raptor's nest will interfere with the electrical distribution along the power lines. The present raptor perch system is adaptable for a variety of different sizes of raptors and a variety of different sizes of power poles and the like. In the preferred embodiment of the present invention, the raptor perch system is readily adaptable to existing power poles, relatively inexpensive to manufacture and relatively easy to install.

In a primary embodiment of the present invention, the raptor perch apparatus and system comprises a hub apparatus that attaches to the top end of a power pole, a plurality of lateral support members extending outwardly from the hub apparatus and a lateral end connecting mechanism that connects the lateral ends of adjacent lateral support members or to interconnect the lateral ends of each of the lateral support members so as to circumvent the lateral ends thereof. The hub bracket has a center member with a socket-like center cavity that is received over the top end of the power pole and a plurality of socket-like lateral support brackets that attach to and extend outwardly from the center member. The proximal end of one of the lateral support members is received in one of the lateral support brackets such that the distal ends of each of lateral support members extend outwardly from the pole. In a preferred configuration, the lateral support members have a slight upward angle to provide improved support for the raptor perch apparatus. Preferably, the lateral ends of each of the lateral support members are interconnected to provide additional support for the raptor perch apparatus, particularly when configured for large raptors such as certain eagles and hawks. In one of the preferred embodiments, the lateral end connecting mechanism comprises an end cap at the distal end of each lateral support member, a ring member at the outward end of the end cap and one or more distal support members that connects the ring members of adjacent lateral support members. In a preferred embodiment, the distal support member is a single guy wire or like wire that passes through each of the ring members to circumvent the distal ends of the lateral support members. A turnbuckle or the like is utilized to adjustably join the ends of the guy wire so the user can tighten or loosen the apparatus as desired. In a typical use, the center member of the hub bracket is received directly on the top end of the power pole to dispose the lateral support members in spaced apart relation to the power lines supported by the power pole in order to provide a place for a raptor to perch and nest without contacting the power lines. In an alternative embodiment, which utilized when the power lines are too close to the top end of the power pole, a pole top extension is attached to the top end of the power pole to provide additional space for the raptors to perch or nest. In this embodiment, the center member of the hub bracket is received over an upwardly extending extension bayonet that is clamped to the upper section of the power pole. In this manner, the raptor perch apparatus of the present invention is adaptable to a wide variety of power poles and the like.

Accordingly, one of the primary aspects of the present invention is to provide a raptor perch apparatus and system that has the various advantages discussed above and overcomes the disadvantages and limitations associated with presently available raptor perch apparatuses and systems.

It is an important aspect of the present invention to provide a raptor perch apparatus that attaches to the top end of a power pole or the like to provide a safe location for a raptor to perch and/or nest.

It is also an important aspect of the present invention to provide a raptor perch apparatus that attaches to a power pole or the like in a manner that allows a raptor, including larger sized raptors, to perch and/or nest without risk of contacting power lines or other electrically energized components.

It is also an important aspect of the present invention to provide a raptor perch apparatus having a hub bracket that attaches to the top of a power pole or to an extension bayonet extending upwardly from the pole, a plurality of lateral support members that extend outwardly from the hub bracket and a distal support member that interconnects the distal ends of the support members to provide a safe location for a bird, particularly large raptors, to perch and nest.

Another important aspect of the present invention is to provide a raptor perch system comprising a power pole or the like having one or more cross-members having electrically energized lines attached thereto, a hub bracket attached to the top of a power pole, a plurality of outwardly extending lateral support members that are each attached to the hub bracket by a lateral bracket having a plurality of lateral brackets and a wire member that interconnects the distal ends of the support members.

Yet another important aspect of the present invention is to provide a raptor perch apparatus and system that provides a perching and/or nesting area for raptors on a power pole which reduces the risk of the raptors contacting the electrically energized components on the power pole.

Yet another important aspect of the present invention is to provide a raptor perch apparatus and system that provides a safe location for raptors to perch and/or nest which is readily adaptable to existing power poles, relatively inexpensive to manufacture and relatively easy to install.

Figure 2:
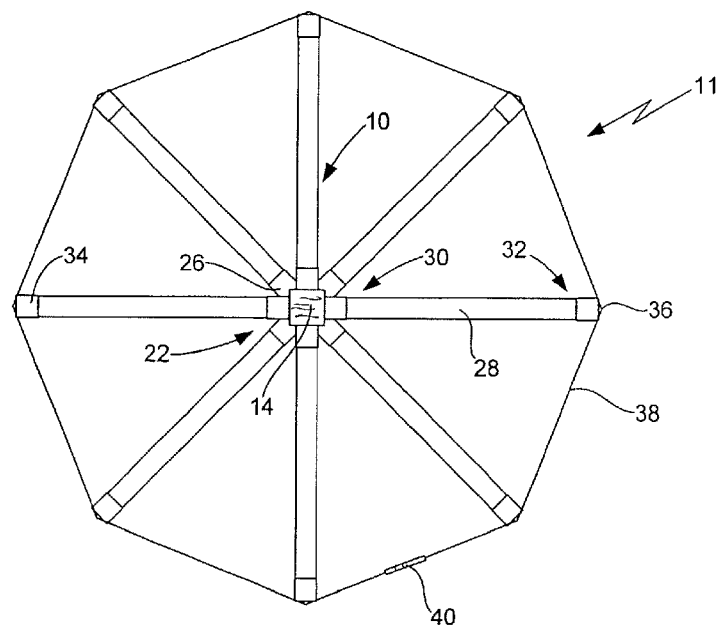
FIG. 2 is a top view of the raptor perch system shown in FIG. 1.

A raptor perch apparatus that is configured pursuant to a preferred embodiment of the present invention is shown generally as 10 in FIGS. 1 through 4. As shown in FIG. 1, raptor perch apparatus 10 is utilized as part of a raptor perch system that is configured to safely allow a raptor 12 to perch and/or form a nest on a power pole 14 above the electrical transmission or power lines 16 that are supported by cross-members 18 located near the upper section 20 of power pole 14. The raptor perch system 11 of FIGS. 1 and 2 is shown installed on a power pole 14 having an upper section 20 with sufficient pole length above the power lines 16 to place raptor perch apparatus 10 such that the raptor 12 can safely perch and/or nest thereon. In such an installation raptor perch apparatus 10 is attached directly to the top end 21 (shown in FIGS. 3 and 5) of power pole 14, which can have a round, square, rectangular or other cross-section.

Figure 3:
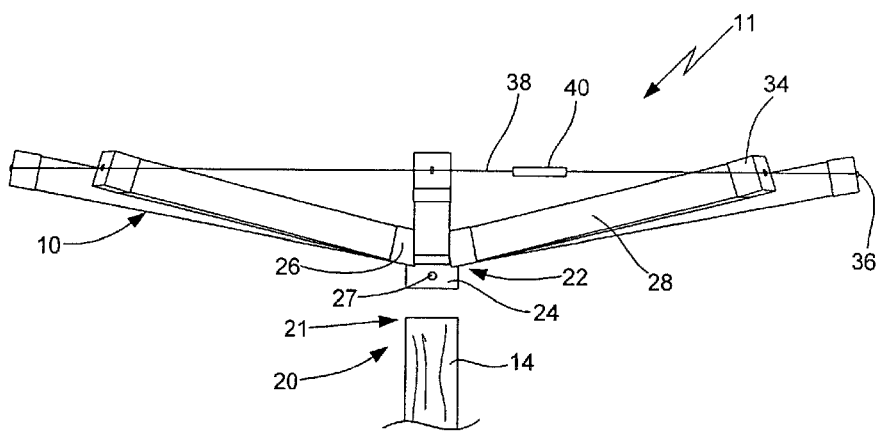
FIG. 3 is a side view of the raptor perch apparatus of FIG. 1 shown in spaced apart relation to the top end of the pole of FIG. 1.

As shown in FIGS. 1 through 4, the raptor perch apparatus 10 of the present invention generally comprises a hub bracket 22 that is mounted to top end 21 of power pole 14. In a preferred embodiment, hub bracket 22 is made out of an alloy steel material having galvanized plating, which provides a hub bracket 22 that is sufficiently strong to support raptor perch system 10 and one or more raptors 12 that may rest or nest thereon. As well known to those skilled in the art, a wide variety of other materials, including other metals, composites and the like, will provide the strength and corrosion resistance desired for the components of the present invention. Hub bracket 22 has a center member 24 that is sized and configured such that top end 21 of power pole 14 will fit within a center cavity 23 (FIG. 4), preferably snugly, of center member 24 in a manner similar to a socket or cap being placed on the top end 21 of power pole 14. Alternatively, the center section 24 can be attached to the top end 21 of power pole 14 utilizing screws, nails and/or other conventional connectors 25 which are inserted through one or more previously provided (preferably) apertures 27, as shown in FIG. 3 in center member 24. Generally, if power pole 14 is made out of wood, the user may want to avoid putting holes in the wood and the use of connectors 25 through the holes due to problems such holes may cause. These problems include splitting at the stress points, providing a place for rotting to occur and hole enlargement from the expansion and contraction due to snow and/or ice in the holes.

Figure 4:
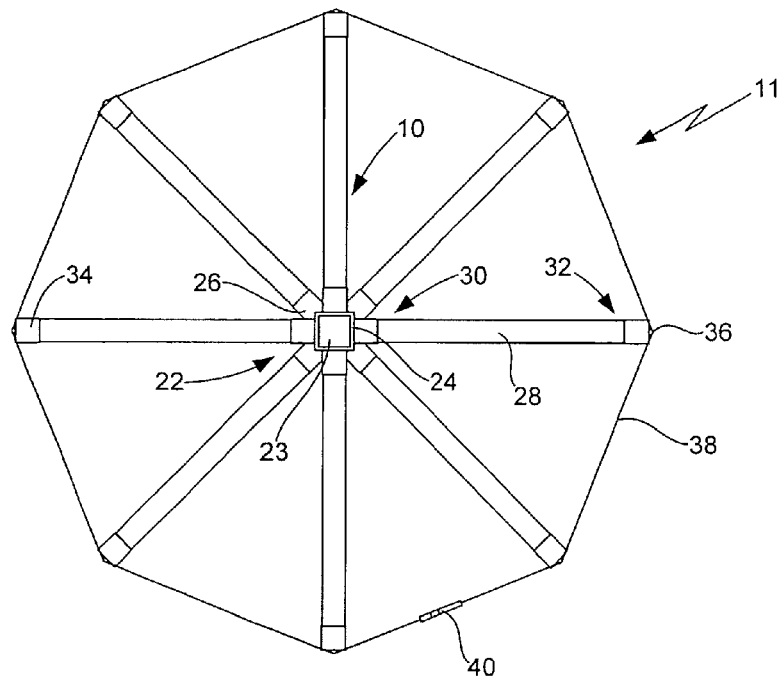
FIG. 4 is a bottom view of the raptor perch apparatus of FIG. 3.

Hub bracket 22 also comprises a plurality of outwardly extending lateral brackets 26, attached to or integral with center member 24, that are each sized and configured to receive and support one of the lateral support members 28 that extend outwardly from hub bracket 22. In a preferred embodiment, the lateral brackets 26 are configured generally similar to a socket or in a socket-like configuration and are welded to center member 24 to form hub bracket 22. As shown in FIGS. 2 and 4, the lateral brackets 26 at the corners of a square center section 24 will be shorter than those along the sides of center section 24 to provide for the use of uniform length lateral support members 28, which is beneficial for connecting the outward ends, as set forth below, of adjacent lateral support members 28.

Lateral support members 28 extend outwardly from hub bracket 22 to provide the desired area for the raptor 12 to perch and/or nest. In a preferred embodiment, the lateral support members 28 extend outwardly and slightly upwardly from hub bracket 22 to better dispose the raptor perch apparatus 10 above the power lines 16, as shown in FIG. 1. In a preferred embodiment, the lateral support members 28 have an upward angle of approximately 10 degrees relative to a generally planar top end 21 of power pole 14. As will be readily appreciated by those skilled in the art, lateral support members 28 can be manufactured in a variety different lengths depending on the size of raptor desired to be protected by the raptor perch apparatus 10. For instance, lateral support members 28 can be four, six, eight or ten feet in length. Naturally, many other lengths are also available. Typically, the size selected for lateral support members 28 should be sufficient for the size of the likely raptor 12 (i.e., a large eagle versus a smaller sized hawk or falcon) that will utilize the raptor perch apparatus 10. As shown in FIG. 2, it is preferred that each of the lateral support members 28 be of the same length to provide a balanced raptor perch system 10 as it sits atop power pole 14. Lateral support members 28 can be made out of a wide variety of different materials, including wood, metal, composites and the like. In one preferred embodiment, the lateral support members 28 are made out of a treated solid Douglas Fir or laminated wood members (beams). In an alternative embodiment, the lateral support members 28 are integral with the lateral brackets 26 or the entire hub bracket 22.

As best shown in FIGS. 2 and 4, the proximal end 30 of each lateral support member 28 is sized and configured to fit within or attach to the lateral brackets 26 of hub bracket 22. Preferably, the proximal ends 30 of lateral support members 28 are cooperatively configured with lateral brackets 26 such that a tight fit is achieved and the use of connectors is avoided. As with the power pole 14, however, the lateral support members 28 can be joined to the lateral brackets 26 with screws, nails, bolts and/or a variety of other connectors (not shown). The preferred configuration for raptor perch apparatus 10 has a lateral end connecting means that connects the distal ends 32 of each of the lateral support members 28. In a preferred embodiment, the lateral end connecting means comprises an end cap 34 placed on the distal end 32 of each lateral support member 28, a ring member 36 attached to or integral with the outward end of end cap 34 and a distal support member, such as guy wire 38, that connects the distal ends 32, at ring members 36, of each lateral support member 28. End cap 34 is placed over the distal end 32 and securely attached thereto with screws, nails, bolts and/or other connectors (not shown). The end caps 34 can be made out of a variety of materials. In a preferred embodiment, the end caps 34 are made out of the same material as the hub bracket 22 (e.g., an alloy steel that is galvanized). In a preferred embodiment the guy wire 38 passes through each of the ring members 36 so as to generally circumvent the raptor perch apparatus 10 at the distal ends 32 of each lateral support member 28, as best shown in FIGS. 2 and 4. A variety of different types of wires can be utilized for guy wire 38. In the preferred embodiment, a single wire is utilized for guy wire 38 and a tensioning device 40, such as a turnbuckle or like device, is used to tighten the guy wire 38 and more securely hold raptor perch system 10 together on top of power pole 14. In an alternative embodiment, a plurality of distal support members 38 can be used to connect ring members 36 of adjacent lateral support members 28. Preferably, each of the plurality of distal support members 38 would be made from a generally stiff, non-elastic material.

Figure 5:
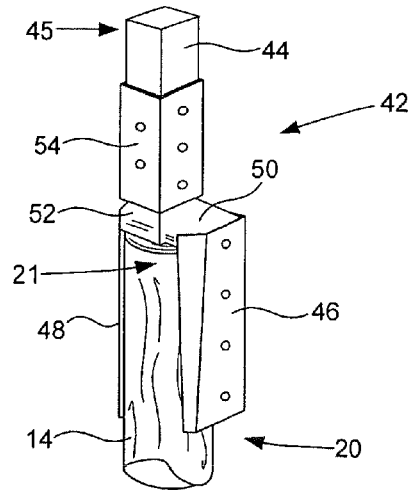
FIG. 5 is a side view of a pole top extension suitable for use with the raptor perch system of the present invention to place the system on top of an existing power pole, according to some embodiments of the present invention.
Figure 6:
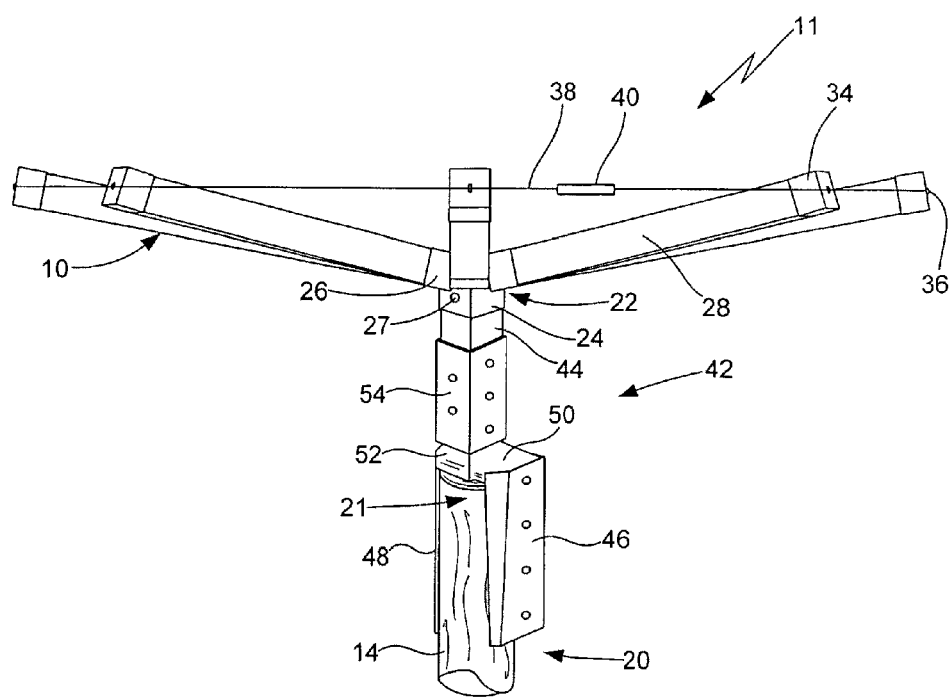
FIG. 6 is a side view of a raptor perch system utilizing the raptor perch apparatus of FIGS. 3 and 4 and the pole top extension of FIG. 5, according to some embodiments of the present invention.

Preferably, the various components of the raptor perch apparatus 10 are put together on the ground, utilizing commonly available tools, and then the entire apparatus 10 is placed on the top end 21 of power pole 14 and the center member 24 is secured thereto using one or more connectors 25. As known to those skilled in the art, however, very often the cross-members 18 and, therefore, the electrical power lines 16 are positioned so close to the top end 21 of power pole 14 that there is not sufficient length between top end 21 and power lines 16 for the raptor perch apparatus 10 to be placed in a manner that will safely protect the raptor 12 and its nest. In these configurations, it is preferred that the raptor perch apparatus 10 of the present invention be utilized in conjunction with a pole top extension 42, such as shown in FIGS. 5 and 6. This pole top extension 42 is the subject of U.S. Pat. No. 5,661,946 issued on Sep. 2, 1997 (the "946 patent") to the present inventor, and discussed more fully below. The '946 patent is incorporated by reference herein as though fully set forth herein. As set forth in the '946 patent, the pole top extension 42 can be placed on top of power pole 14 to extend the upper section 20 of power pole 14 and provide an extension bayonet 44, with a top end 45, that can be utilized with the raptor perch system 10 of the present invention to provide sufficient length to install system 10 above power lines 16. In a preferred embodiment, the pole top extension 42 comprises a pair of bracket members 46 and 48 that attach to power pole 14, matingly interengageable portions 50 and 52 that couple with bracket members 46/48 over the top end 21 of power pole 14 and a rectangular collar 54 that opens upwardly to receive the extension bayonet 44 therein. To install raptor perch apparatus 10 thereon, the center member 24 of hub bracket 22 is attached to extension bayonet 44 with screws, nails, bolts and/or other connectors 25 (as described above). The pole top extension 42 allows retrofit of the raptor perch apparatus 10 to many power poles 14 that may not otherwise be suitable for use of raptor perch apparatus 10.

In another alternative configuration of the present invention, the pole 14 utilized with the raptor perch apparatus 10 can be a relatively short section of a pole, such as a two to four or six foot length of a pole section that is attached to a structure, including those that support power lines 16 or the like, that does not otherwise have an upwardly extending pole or pole-like element that can be utilized as pole 14 with the present invention. As an example, the large metal power structures can be retrofitted with a short pole section that can function as pole 14 with apparatus 10. The short pole 14 can be attached anywhere on the structure where it is safe and convenient to place the raptor perch apparatus 10 so the raptor 12 can perch and/or nest. Various devices can be utilized to attach an upwardly extending pole 14, which can have a round, square, rectangular or other cross-section, to the structure. In this manner, raptor perch apparatus 10 can be utilized on a wide variety of different structures, including buildings.

As set forth above, the raptor perch apparatus 10 of the present invention provides a safe perch for large birds, such as eagles, hawks and other raptors 12, and provides a place for the raptors 12 to nest. The raptor perch system 11, comprising the raptor perch apparatus 10 and power pole 14 (FIGS. 1 and 2) or these two components with pole top extension 42 (FIG. 6), significantly reduces hazardous contact by the raptors 12 against the power lines 16 and allows for nesting without interfering with the power lines 16 or any other electrically charged equipment on power pole 14. Another benefit of the use of raptor perch system 11 is that it allows power line crews to work on the power poles 14 and/or power lines 16 without disturbing any raptor nest, which could be a violation of one or more federal, state or local laws and/or regulations, that may be in place on the raptor perch apparatus. Yet another benefit of the present raptor perch apparatus 10 is that it can be made out of materials such that it will generally blend with the upper section 20 of power pole 14 and the surrounding area so as not to create an eyesore. Use of the raptor perch system 11 will reduce power outages that would otherwise be caused by the wings of large raptors 12 contacting the power lines 16 and will provide for an overall reduction in electrocution deaths of raptors 12.

Exemplary Pole Top Extensions

In some aspects, the invention concerns a pole top extension assembly for mounting a wooden extension bayonet having a rectangular cross section to the flattened top of a cylindrical wooden utility pole. The pole top extension assembly comprising a pair of bracket members each having leg portions extending downwardly from the top of the wooden utility pole, and each bracket member further having a matingly interengageable portion which couples the said bracket members together over the top of pole. At least one of said bracket members including a rectangular collar opening upwardly to receive a bayonet member therein, with said rectangular collar having two pairs of opposite side walls oriented, respectively, substantially parallel and perpendicular to said leg portions.

Referring now to FIG. 7 a pole top extension 110 constructed in accordance with the present invention is shown which is mounted to the top of a wooden utility pole 121 to add length to the top end of pole 121. Pole top extension 110 can be used for mounting existing wires at a greater height, when needs or code requirements change, or as a replacement for the rotted top section of the utility pole. In either case, extension assembly 110 eliminates the need to replace the entire pole. When assembled, the resulting pole top extension 110 provides a solid structure in which the lower end of a wooden bayonet extension 137 is anchored to the upper end of a wooden utility pole 121.

Pole top extension 110 is comprised of a bracket assembly, generally designated 123, and a rectangular wooden extension bayonet 137. Bracket assembly 123, includes a pair of U-shaped bracket members 125 and 127 each having a leg portion 130 which extends circumferentially partially around the side of the pole to hold the assembly in place at the top end of the utility pole 121. Each leg portion 130 engages the top end of pole 121 at circumferentially spaced intervals to stabilize the assembly on poles of somewhat differing diameter, and leg portions 125 and 127 are formed to extend downwardly from the top of the pole by a distance sufficient for securement of each leg portion 130 to the opposing sides of the pole by at least one fastener. Preferably, a plurality of holes 132 on opposing bracket members 125 and 127, are provided so that they can be aligned for receipt of a plurality of lag bolts 34 which extend through the pole and couple leg portions 130 together.

At the top of bracket member 125 is formed a transversely extending upper portion 129. Bracket member 127 similarly is formed a corresponding transverse upper bracket portion 131. Upper portions 129 and 131 of the bracket members extend transversely over the top of wooden utility pole 121 and matingly interengage with each other. In the preferred form, upper portions 129 and 131 have a box-like or rectangular channel configuration and are formed to telescopically slide one inside the other. Aligned openings 133 allow a lag bolt 136 to be passed through the center of the telescoped channels 129 and 131. Upper bracket portions 129 and 131, therefore, may be coupled together when placed over the top of poles 121 of varying diameter, and the brackets 125 and 127 rest on the top flattened end of pole 121. Also shown is lag bolt 140 which passes through the center of the rectangular channels to secure the same together in telescopic relation.

In order to receive and support a pole extension member, one of the bracket members, in this case bracket member 127, has a collar assembly, generally designated 135. Collar assembly 135 opens upwardly to receive the lower end of an extension bayonet 137 therein. As thus far described, bracket assembly 110 has a structure which is essentially the same as has been employed in the prior art to secure cylindrical, tubular, fiberglass pole top extensions to utility poles. In the pole top extension assembly of the present invention, however, collar 135 and extension bayonet 137 have been significantly improved.

In order to provide greater strength, durability and alignment stability, collar 135 of the present pole top extension assembly is formed as a rectangular collar, and bayonet 137 is formed as a wooden member having a rectangular cross-section substantially mating with, and slidably received in, collar 135. Rectangular collar 135 is defined by two pairs of opposite sidewalls 141 and 143 which are oriented substantially perpendicular and substantially parallel to leg portion 130 of bracket member 127, respectively. Sidewall pair 141 and sidewall pair 143 each have a plurality of aligned holes 145 through which lag bolts 136 extend to attach wooden extension bayonet 137 to collar assembly 135.

Additionally, and very importantly, collar 135 of the present pole top extension assembly has a height dimension which is significantly greater than that used for fiberglass extensions. Preferably, this rectangular collar 135 will be in the shape of a square such that its strength will be the same in either of two perpendicular directions. In addition, this square shape of the extension bayonet will enable the leg portions to be attached to one of two perpendicular orientations at the top of the utility pole. This allows for flexibility in the positioning of the pair of leg portions 130 of bracket member 127, such that the leg portions 130 may be mounted so as not to interfere with existing hardware mounted near the pole top.

As will be seen, a plurality of vertically spaced, fastener-receiving openings 145 are provided in mutual sides 141 and 143 of the collar. The collar height is preferably at least about two times the width dimension of the collar so as to extend a substantial distance up extension bayonet 137. Conventional fiberglass collars have a height less than the collar diameter and are designed to receive a single transverse lag bolt therethrough.

The substantial height of the present collar is particularly helpful in resisting the substantial moments induced by hanging heavy equipment on a side of extension bayonet 137. Thus, a transformer, which can weigh, for example, 1000 pounds, or more, can be mounted to any side of bayonet 131 and as many as five lag bolts 136 used to couple the bayonet to collar 135. The combination of a solid, wooden bayonet, a plurality of lag bolts, and a high rectangular collar, produces a very stable high strength pole top extension which has a greatly increased number of possible applications in the utility industry. The present invention has been tested to hold 2500 pounds cantilevered at 18 inches from the extension bayonet without failure.

As extension bayonet 137 is a solid wooden member and not a hollow fiberglass tube, extension bayonet 137 is, itself, of a much higher strength than previous bayonets. Prior art fiberglass extensions often are only rated to support a cross-arm and wires, and they cannot be asymmetrically guyed or used to carry heavy equipment. Conversely, the use of a solid wooden extension bayonet 137, being much stronger, enables asymmetric guying any side of pole 121. The need for guying is specifically important when the utility pole stands at a corner run location in a utility line. At corner run positions, where the line direction changes substantially, (typically by about 90.degree.), a transverse moment is present which tends to topple the pole. As the present wooden extension bayonet 137 is of high strength and its coupling to pole 121 is capable of withstanding substantial moments, guy wires may be attached to it from a side opposite the corner run moment.

In an additionally important aspect of the use of a solid, wooden bayonet is that field assembly is much easier, as compared to fiberglass extensions. Pole top extension assembly 110 allows on the ground assembly of components and mounting of cross-arms and transformers. Thus, bracket member 127 can be attached easily to bayonet 137 using conventional tools, such as, a hand drill and wrenches. It is easy to drill holes into an extension bayonet that is made of wood, whereas clean, fracture-free holes in fiberglass usually require a carbide drill. Moreover, the drilled holes in the present wooden extension bayonet 137 do not tend to significantly weaken the structure, as can be the case when drilling into a fiberglass tube.

In addition, the attachment of all cross-arms, transformers and guying wires onto the extension bayonet can be performed while the unit is still on the ground. Later, the assembly, including bracket 125, can be raised into a position on top of wooden utility pole 121. Consequently, assembly of pole top extension 110 does not first require adding a bracket assembly to the top of an existing utility pole, and then subsequently adding an extension bayonet to the assembled bracket.

In order to support heavy loads, extension bayonet 137 rests directly on the interengaged bracket portions 129 and 131, which in turn rest directly on the flattened top end of wooden utility pole 121. In this arrangement, the weight of the extension bayonet 137 and anything attached to it is supported directly by the top flattened end of the utility pole 121 rather than just by a fastener. This represents a significant improvement over prior art fiberglass extension systems in which the extension bayonet is bolted to the collar in a raised position, thus having the entire weight of the assembly held by one lag bolt. The present wooden extension bayonet 137 is pre-assembled with collar 135. Bolt holes are drilled in the field to receive lag bolts at various heights for the mounting of cross-arms and/or other heavy equipment. The bayonet assembly 137 also has a plurality of holes 139, pre-drilled near its lower end to receive lag bolts 136 such that extension bayonet 137 is held firmly in place in collar 135. Typically, at this lower end, three holes are drilled through the extension bayonet in one direction and two holes are drilled through the lower end of the extension bayonet in a perpendicular direction. These three corresponding lag bolts pass through sidewalls 143 of collar 135 and two corresponding lag bolts pass through sidewalls 141 of collar 135 securing the extension bayonet 137 to the collar 135. At the top end of bayonet extension 139, a hole 138 is drilled to allow for insertion of a hoisting pin which is used for installation using a crane and sling.

FIG. 8 shows a pole top extension assembly 110 positioned for mounting at the upper end of a wooden utility pole 121. Leg portions 130 have a plurality of transverse holes 132 through which a plurality of lag bolts 134 are passed. Lag bolts 134, when passed through utility pole 121 and tightened into place, couple bracket members 125 and 127 together around the pole. The matingly interengaging upper bracket portions 129 and 131 are also shown and a lag bolt 140 passes through the center of the rectangular channels to secure the same together in telescopic relation. In order to provide stiffening of the collar area of the bracket assembly, the inner box-shaped channel portion 129 preferably is formed with transversely extending webs 161 having central aligned openings therein to receive lag bolt 140 therethrough. FIG. 10 illustrates a perspective view of the pole top extension when fully assembled in position between the wooden utility pole 121 and the wooden extension bracket 137. FIG. 12 shows a top plan view of the apparatus as assembled in FIG. 10.

An optional spacer member 133 may be provided which is to be inserted between the sliding bracket member leg portion 130 of bracket 127, and wooden utility pole 121. This spacer member 133 is used to enable securement of bracket members 125 and 127 to smaller diameter utility poles 121. The spacer allows brackets 125 and 127 to be coupled tightly against the smaller pole when lag bolts 134 pass through spacer member 133. Spacer member 133 has stiffening flanges 163 with holes 132 which are positioned to line up with holes 132 in bracket member 127, thus allowing lag bolt 134 to pass through spacer member 133 and support the same with bracket member 127. This allows the mating of upper portions 129 and 131 to occur while ensuring that bracket member 127, through its contact with spacer member 133, can be fastened by lag bolts 134 to tightly urge the spacer against the surface of wooden utility pole 121 on one side while bracket 125 engages the other side of the pole.

The curved surface 165 of optional spacer member 133, as is best shown in the exploded plan view of FIG. 9, is adapted to mate with the curved outer surface of utility pole 121 such that pole top extension 110 fastens tightly and snugly into position and will not move about on utility poles of smaller diameter. FIG. 11 illustrates a side elevational view of the assembled pole top extension fastened to a small diameter pole 131 with the spacer member 133 included. FIG. 13 shows a top plan view of the apparatus as assembled in FIG. 11 with the spacer member 133 and utility pole 121 shown in dotted lines such that their mating surfaces are clearly revealed.

Exemplary Extension Accessories

Figure 14:
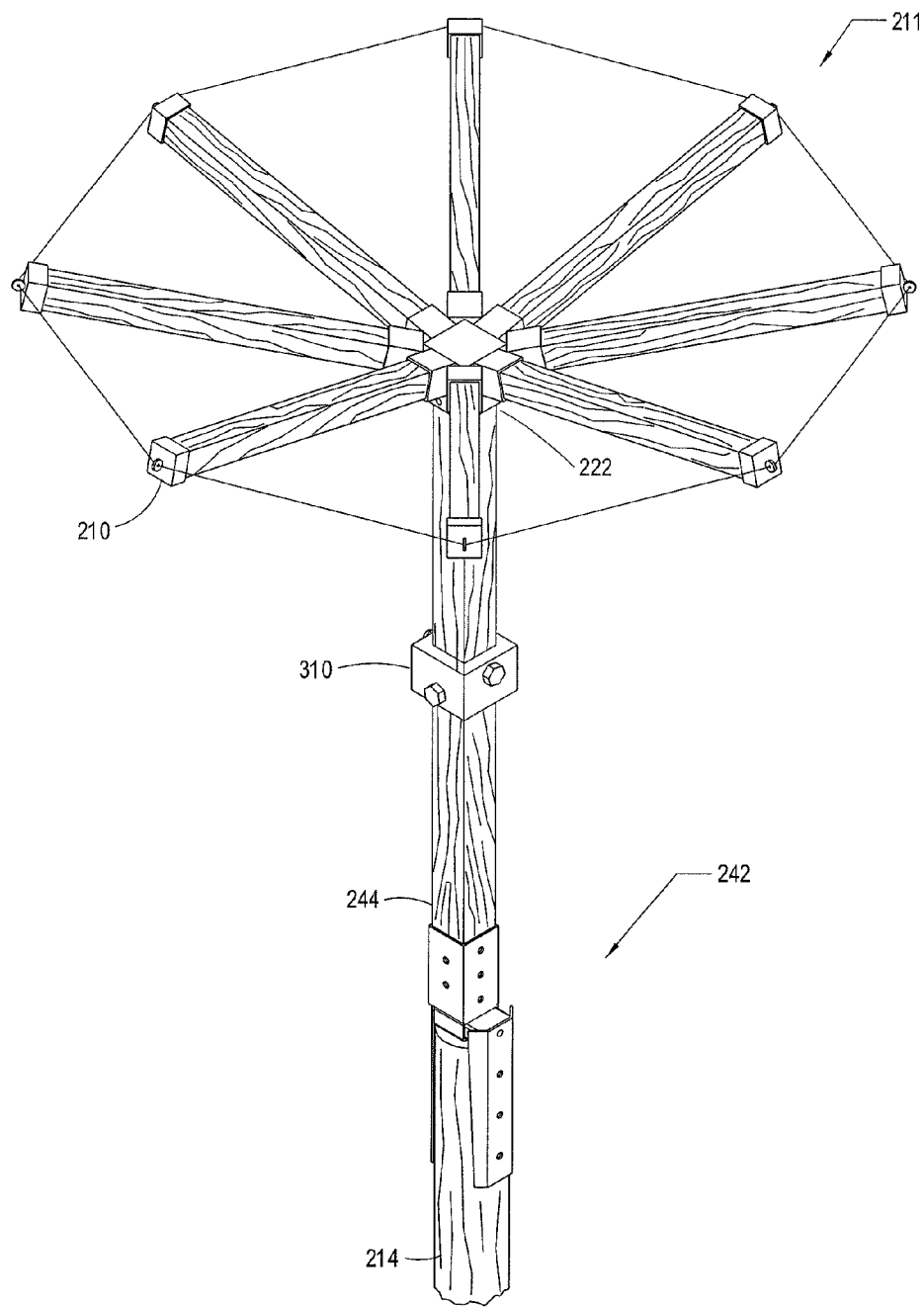
FIG. 14 is a top perspective view of a system having a raptor perch and an accessory mount in accordance with some embodiments of the present invention.

In some aspects, the invention concerns accessories (and brackets and mounts therefor) for attaching to an extension bayonet. Referring now generally to the exemplary illustrations of FIGS. 14-21, and particularly to FIG. 14, some embodiments of the invention can include accessory assembly 310 and raptor perch system 211. Accessory assembly 310 can be engaged with extension bayonet 244. Raptor perch system 211 can include raptor perch assembly 210 having a hub bracket 222 engaged with a distal (or top) end of extension bayonet 244. Extension bayonet 244 can be engaged on a proximal (or bottom) end with extension bracket 242 engaged with a distal (or top) end of pole 214. Pole 214 may support one or more power lines or telephone lines. Without limitation, some raptor perch systems for use in embodiments of the present invention are discussed above (for example, and without limitation, with reference to FIGS. 1-6). Without limitation, some extension bayonets for use in embodiments of the present invention are discussed above (for example, and without limitation, with reference to FIGS. 5-13).

It is to be appreciated that accessory assembly 310 can be adapted to receive one or more accessories thereon for positioning on extension bayonet 244 below raptor perch system 211. An accessory to be engaged with the extension bayonet may include, without limitation, wireless cellular antennas, microwave antennas, other wireless communication means, lights, and/or generally any accessory that may be placed above a power line supported by the pole to which the extension bayonet is engaged.

Figure 15:
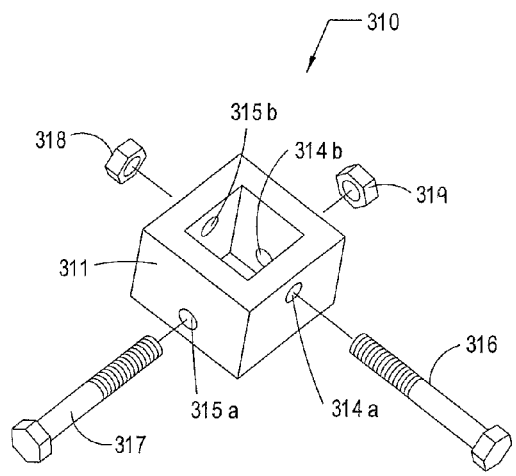
FIG. 15 is a top perspective view of an accessory mount having two fasteners in accordance with some embodiments of the present invention.
Figure 16:
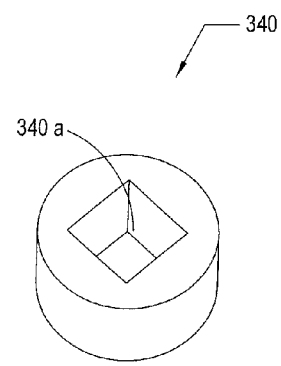
FIG. 16 is a top perspective view of another accessory mount in accordance with some embodiments of the present invention.
Figure 17:
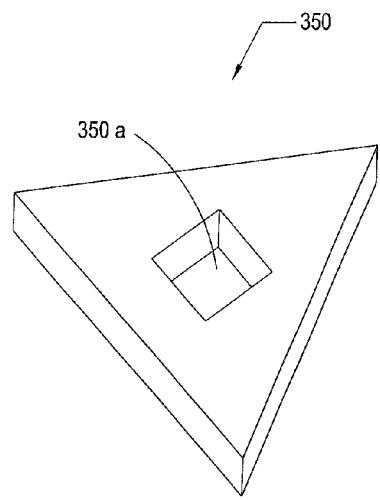
FIG. 17 is a top perspective view of another accessory mount in accordance with some embodiments of the present invention.

In some implementations, accessory assembly 310 can be engaged to extension bayonet 244 with one or more fasteners. As illustrated in FIG. 15, accessory assembly 310 can include center member 311 having a central opening sized and configured to be positioned axially over extension bayonet 244. In some examples, and discussed above, extension bayonet 244 may be rectangular, and thus the central opening in center member 311 may also be rectangular. However it is to be appreciated that other extension bayonet and central opening shapes are contemplated in accordance with embodiments of the invention. In some examples the central opening may have an inner dimension slightly larger than an outer dimension of the extension bayonet for fitting thereon. Accessory assemblies can have various shapes, sizes, and dimensions in accordance with embodiments of the present invention. For example, and without limitation, accessory assembly 340 can have a rounded outer shape and rectangular center cavity 340a, and accessory member 350 can have a triangular outer shape and rectangular center cavity 350a.

Center member 311 may include one or more apertures 314a, 314b, 315a, 315b through which one or more fasteners 316, 317 may be inserted. When installed, each fastener may be inserted through a bore in the extension bayonet so as to secure the accessory assembly. For example, and without limitation, center member 311 of accessory assembly 310 can include first and second apertures 314a, 315b through which fastener 316 may be inserted and secured with a fastener 318. Similarly, fastener 317 can be inserted through apertures 315a, 314b and secured with fastener 319. The apertures for the fasteners may be included on one or more sides of the center member. FIG. 15 illustrates apertures on perpendicular sides. It is to be appreciated that the apertures should be placed such that when fasteners are inserted there through there is no interference between the fasteners. For example, openings 314a, 315b may be positioned in a top portion of center member 311 and openings 315a, 314b may be positioned in a bottom portion of center member 311.

Figure 18:
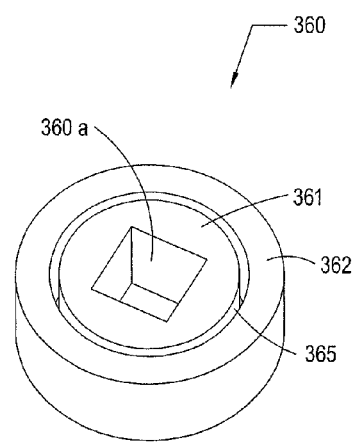
FIG. 18 is a top perspective view of an accessory mount having an inner member and an outer member in accordance with some embodiments of the present invention.

It is to be further appreciated that accessory assemblies can include one or more portions. Referring to FIG. 18, accessory assembly 360 can include inner member 361 and outer member 362 around inner member 361. Inner member 361 can have center cavity 360a for engaging an extension bayonet. In some implementations, outer member 362 may be rotatable relative to inner member 361. Bearings or other commuting mechanisms may be disposed in space 365 formed between inner member 361 and outer member 362. It is to be appreciated that inner member 361 may be fixedly engaged with the extension bayonet and outer member 362 may have one or more accessories attached thereto. As such, rotational adjustment of the accessory may be provided around the extension bayonet without the need to disengage the accessory assembly from the extension bayonet.

Figure 19:
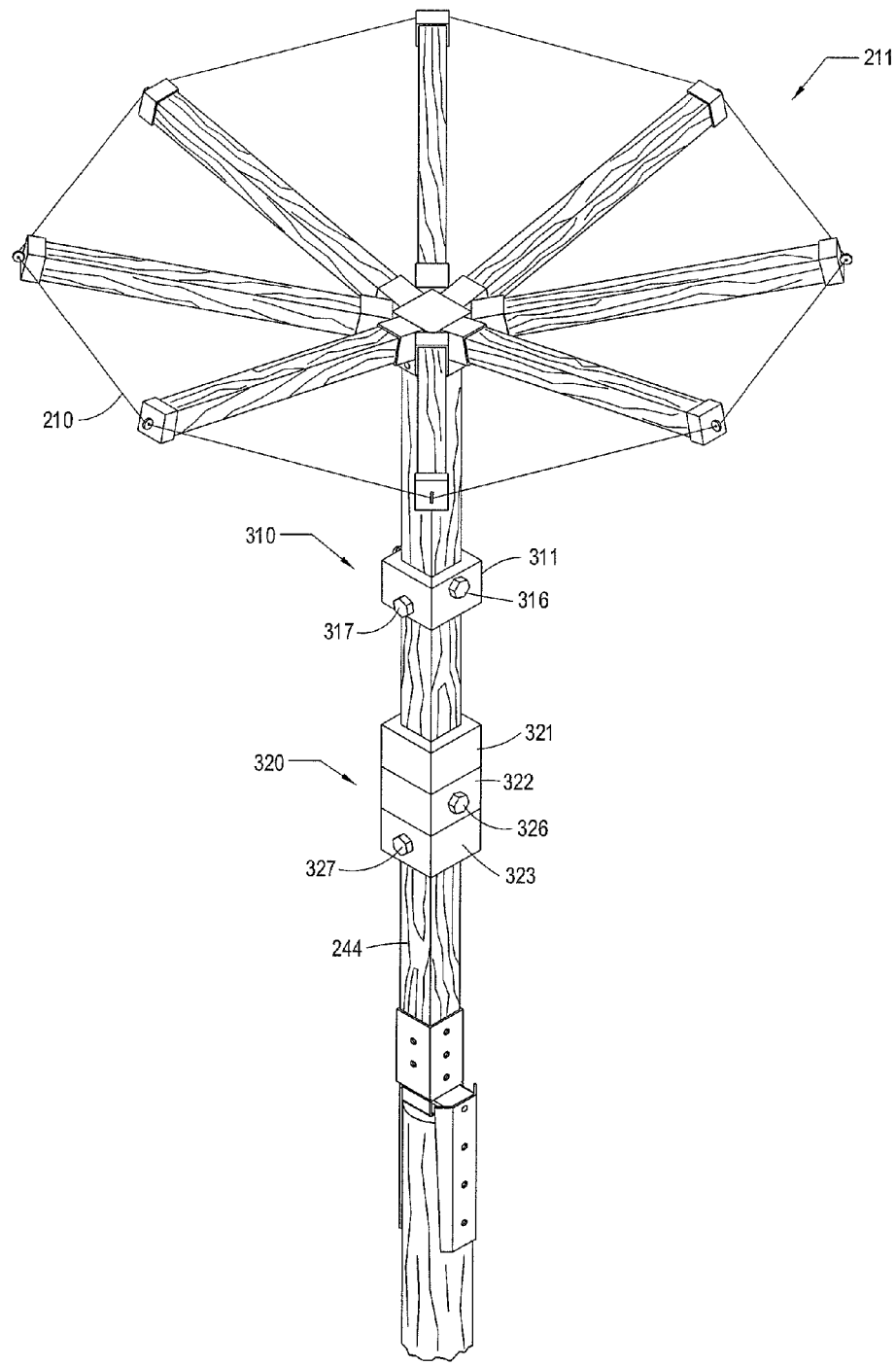
FIG. 19 is a top perspective view of a system having a raptor perch and two accessory mounts in accordance with some embodiments of the present invention, where the second accessory mount has two securing members.

In some implementations, the center member of the accessory assembly may not fixedly engage the extension bayonet by fasteners, but rather may engage the extension bayonet by one or more securing members. Referring to FIG. 19, it can be seen that accessory assembly 310 includes center member 311 and fasteners 316, 317 for engaging extension bayonet 244. Accessory assembly 320 may include center member 321 and one or more securing members (such as securing members 322, 323). Securing member 322 may include apertures and fastener 326 (which may be analogous, but not limited to, that as illustrated by aperture 314a, 315b and fasteners 316, 318 of FIG. 15). Similarly, securing member 323 may include apertures and fastener 327. It is to be appreciated that securing members in accordance with embodiments of the present invention can have any number of fasteners for engaging the securing member to extension bayonet 244. It is also to be appreciated that while although accessory assembly 320 illustrates two securing members 322, 323 with fasteners perpendicularly oriented, the accessory assemblies in accordance with the present invention can include any number, orientation, and positioning of fasteners.

Figure 20:
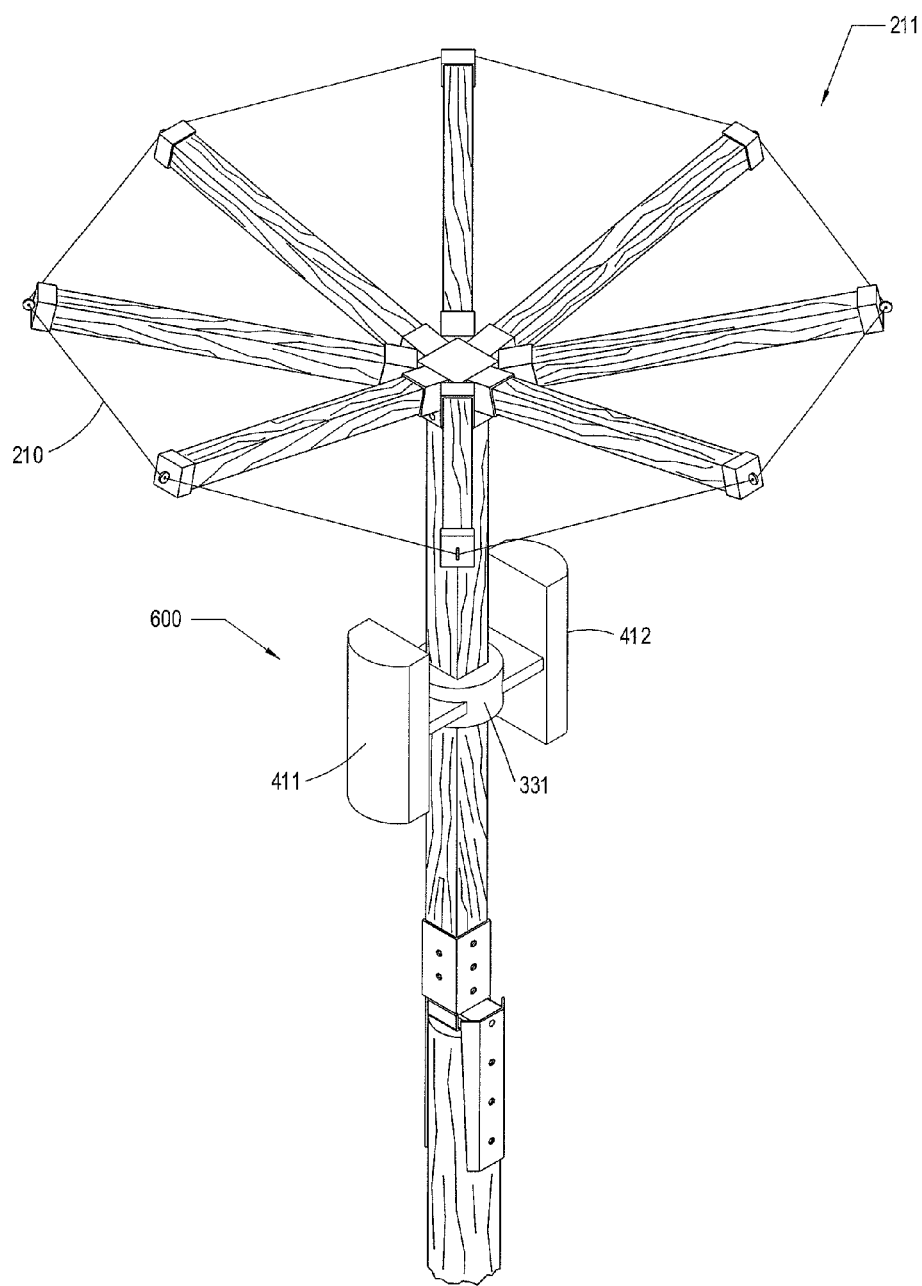
FIG. 20 is a top perspective view of a system having a raptor perch and an accessory mounted below the raptor perch in accordance with some embodiments of the present invention.
Figure 21:
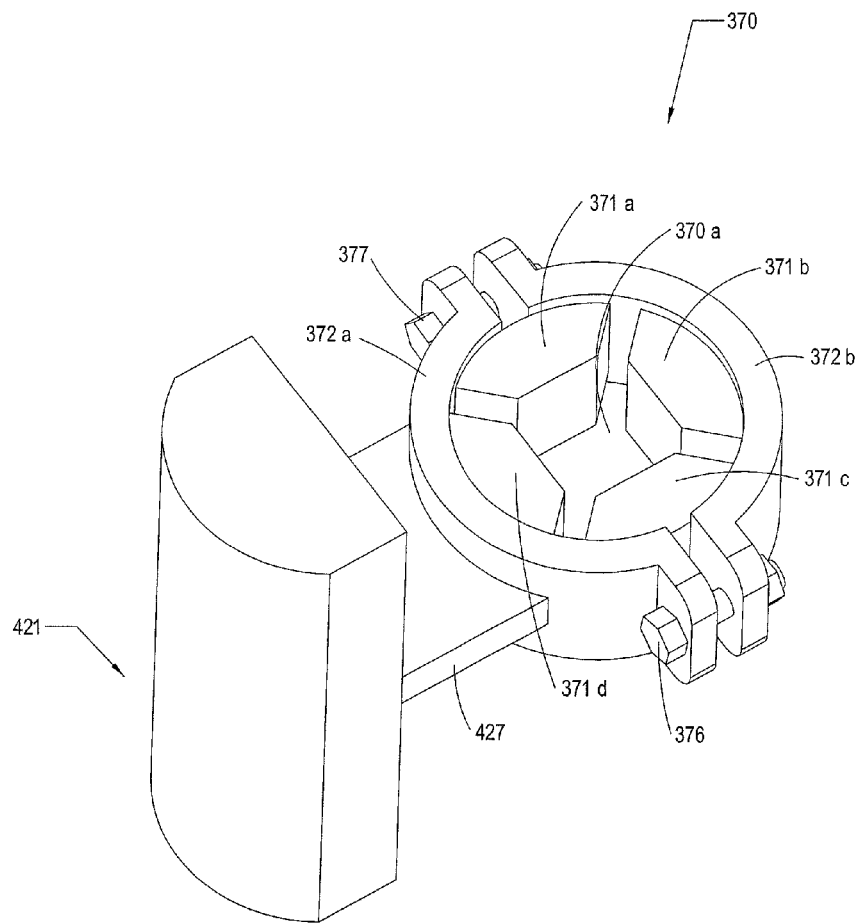
FIG. 21 is a top perspective view of an accessory mount having a plurality of inner member portions and a plurality of outer member portions in accordance with some embodiments of the present invention.

Referring now to FIG. 20, a preferred embodiment of the present invention includes an accessory assembly 600 having one or more accessories 411, 412 engaged via center member 331 to a pole top extension supporting a raptor perch system 211 at a top end thereof. Such embodiments advantageously provide both a place upon which raptors may perch above a power pole and a place upon which accessories may be mounted above the power pole. In some particular embodiments, and as illustrated in the example of FIG. 21, accessory assembly 370 can include one or more inner member portions 371a-d and one or more outer member portions 372a-b. Inner member portions 371a-d may include inner flat surfaces forming center cavity 370a for receiving an extension bayonet. Inner member portions may further include outer rounded surfaces. Outer member portions 372a-b may at least partially circumscribe inner portions 371a-d and secured to one another by fasteners 376, 377. Extending arm 427 may radially extend from one or more of the outer member portions for receiving, attaching to, or otherwise engaging accessory 421. It is to be appreciated that any number of inner member portions, outer member portions, extending arms, and positioning thereof are contemplated in accordance with some embodiments of the present invention.

Exemplary Deflection Accessories

Figure 22:
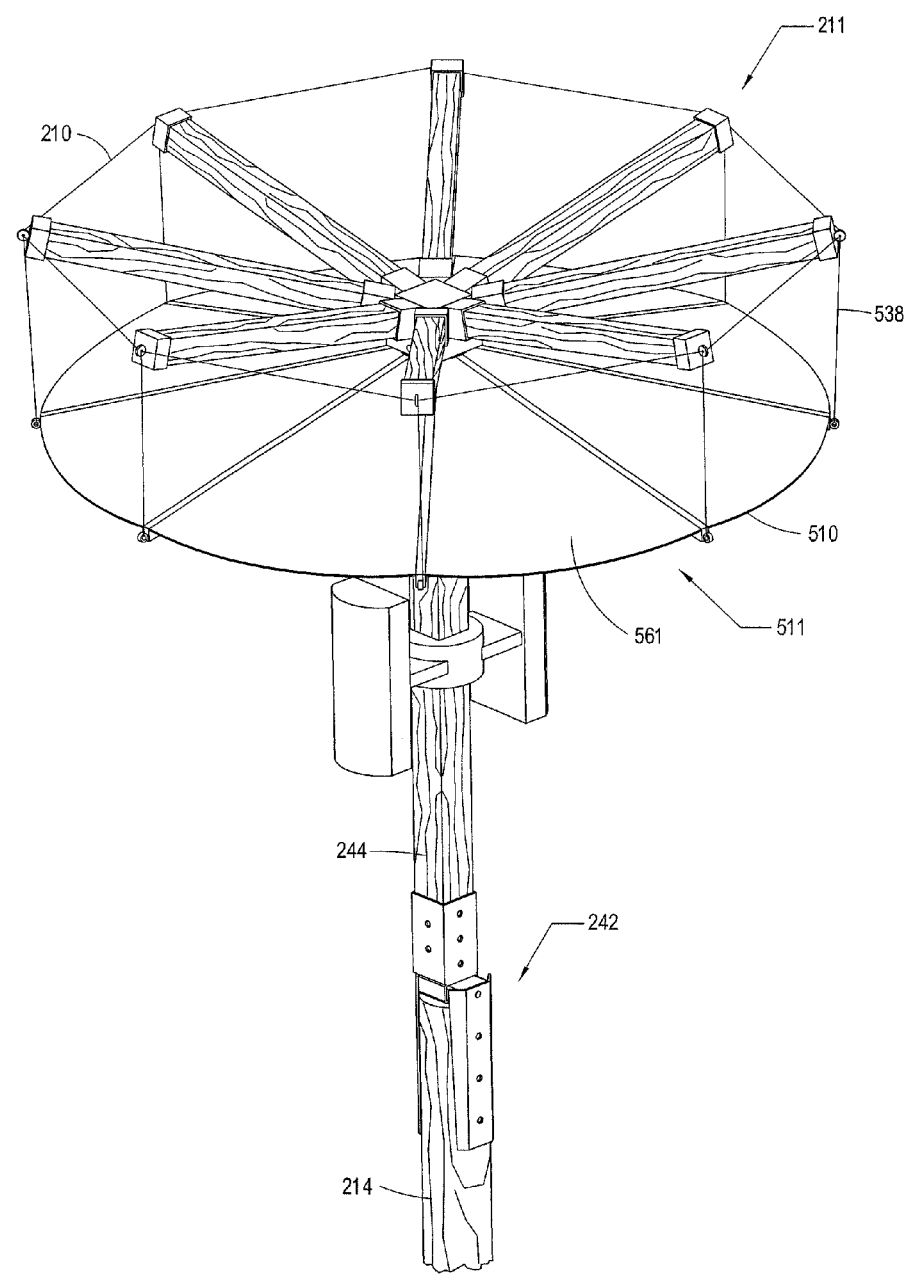
FIG. 22 is a top perspective view of a system having a raptor perch, an accessory mounted below the raptor perch, and a deflecting assembly between the raptor perch and the accessory in accordance with some embodiments of the present invention.

In some aspects, the invention concerns deflection systems for positioned below a raptor perch system. Referring now generally to the exemplary illustrations of FIGS. 22-26, and particularly to FIG. 22, some embodiments of the invention may include a raptor perch system 211 engaged on a distal (or top) end of an extension bayonet 244, and a deflecting system 511 positioned below raptor perch system 211. Deflecting system 511 can include deflection assembly 510 and one or more deflector panels 561. In some aspects, vertical supports 538 can provide circumferential end support to the deflecting assembly by engagement with one or more lateral support members of raptor perch assembly 210. It is to be appreciated that deflector panels 561 should extend sufficient distance from extension bayonet 244 to provide maximum protection of accessories engaged to the extension bayonet and/or power lines supported by pole 214.

Figure 23:
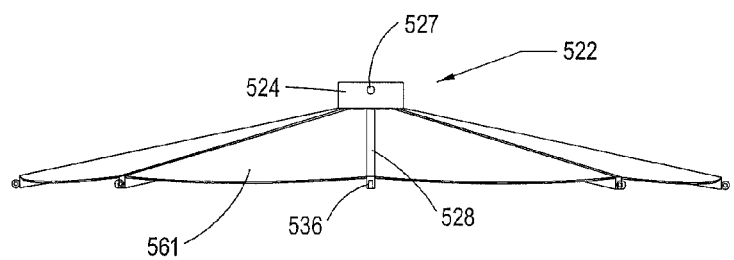
FIG. 23 is a side view of a deflecting assembly in accordance with some embodiments of the present invention.
Figure 24:
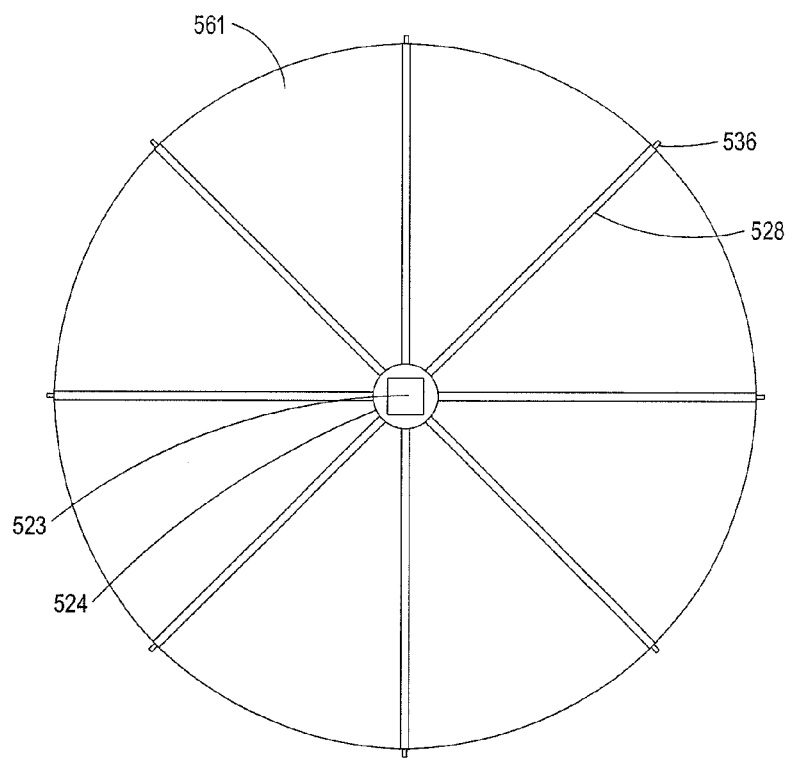
FIG. 24 is a top view of a deflecting assembly in accordance with some embodiments of the present invention.
Figure 25:
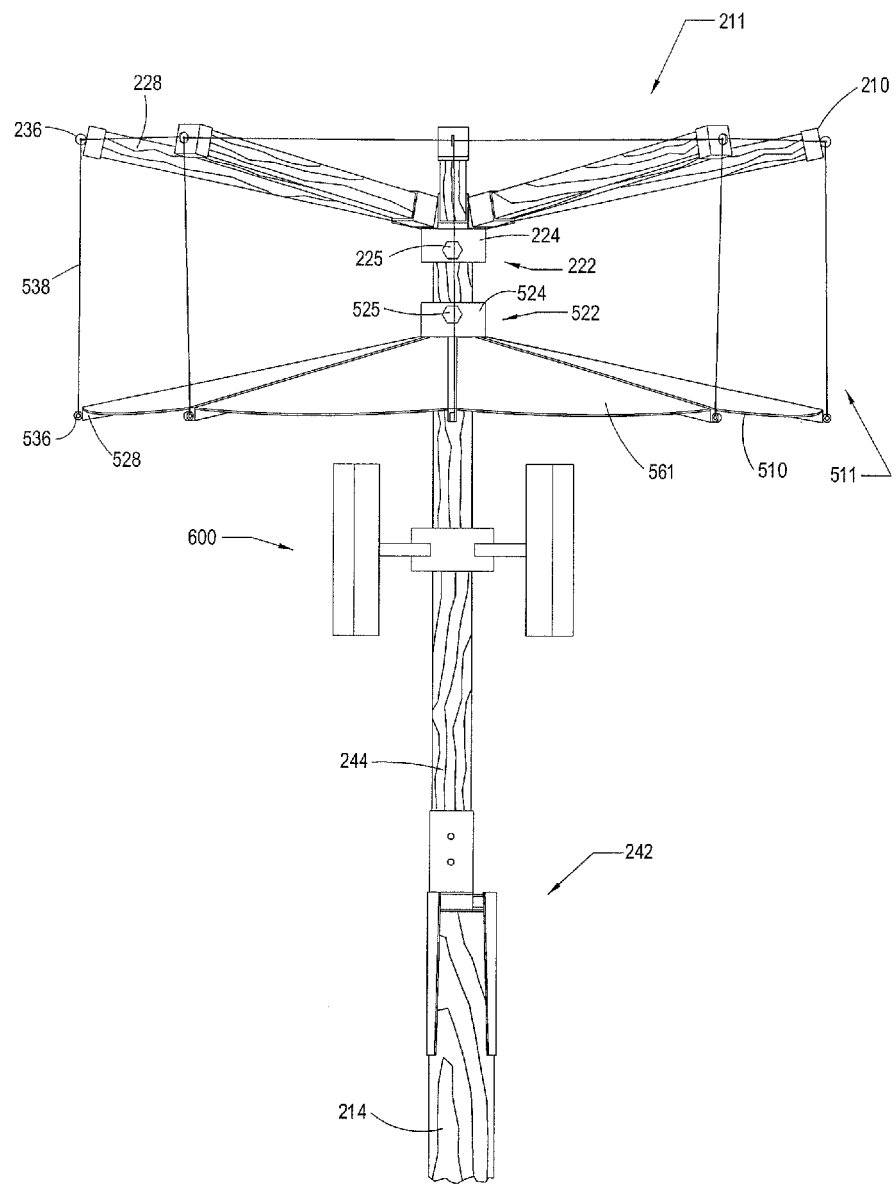
FIG. 25 is a side view of a system having a raptor perch and a deflecting assembly, where the deflecting assembly has a hub bracket engaged to a extension bayonet, in accordance with some embodiments of the present invention.
Figure 26:
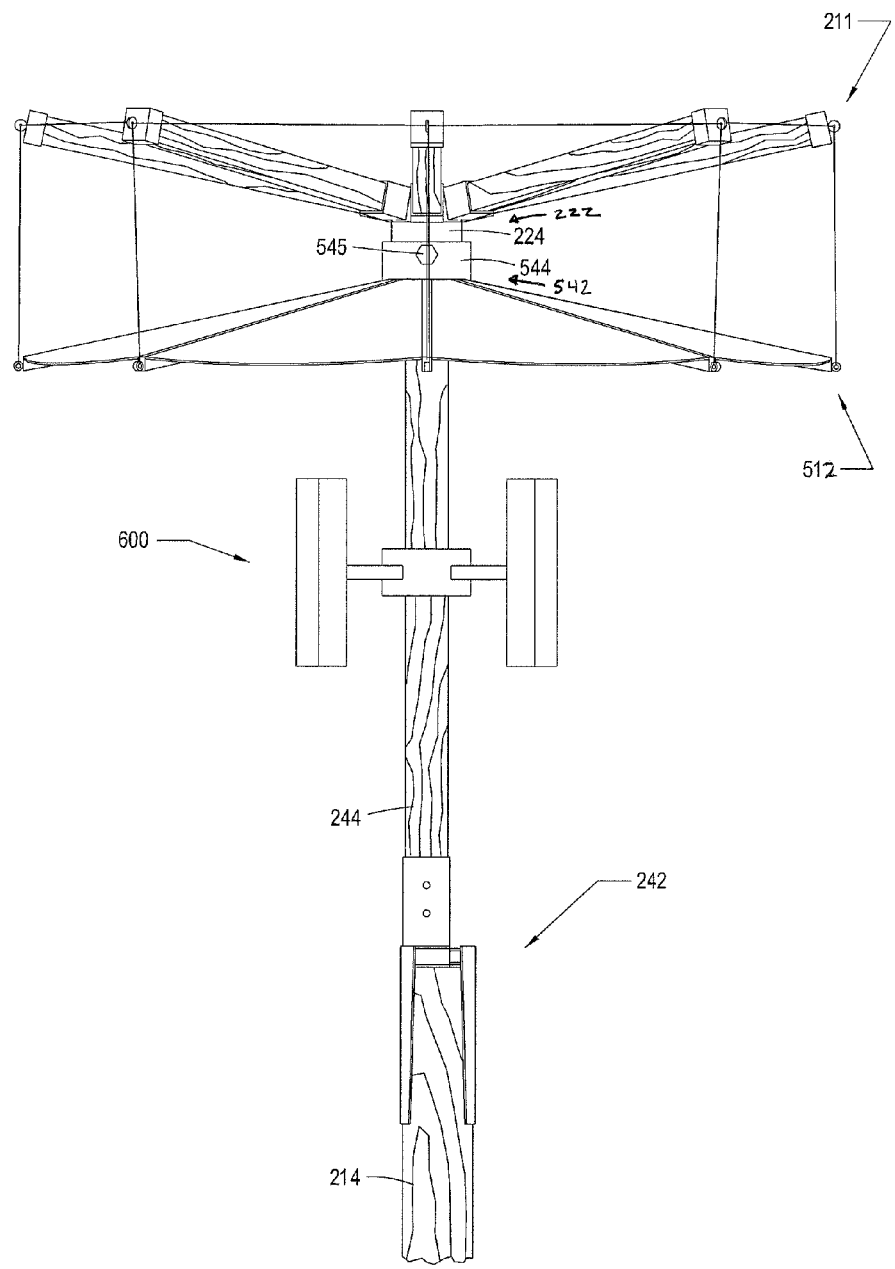
FIG. 26 is a side view of a system having a raptor perch and a deflecting assembly, where the deflecting assembly has a hub bracket engaged to a hub bracket of the raptor perch, in accordance with some embodiments of the present invention.

As illustrated in FIGS. 23 and 24, the deflection assembly can have hub bracket 522 with a center member 524. Center member 524 can have center cavity 523 therein for engaging the extension bayonet (as illustrated in FIG. 25) and/or a portion of the raptor perch system (as illustrated in FIG. 26). One or more apertures 527 may be provided in center member 524 for insertion of fasteners. Lateral support members 528 extend outwardly from hub bracket 522 and can provide structural support to deflector panels 561. One or more of lateral support members 528 may include attaching members 536. In some examples, lateral support members 528 may include rings or hooks though which a wire or cable can be inserted. In some other examples, lateral support members may include end caps on distal ends (analogous to end caps 34 on distal ends of lateral support members 28 of the raptor perch assembly 10 as illustrated in FIG. 4)

It is to be appreciated that in some embodiments, hub bracket 522 may be analogous to the hub bracket of the raptor perch system (for example, hub bracket 222 or any analogous assemblies discussed or illustrated herein). In some other embodiments, hub bracket 522 may be analogous to the center member and/or securing members of the accessory assemblies discussed or illustrated herein. For example, and without limitation, deflector assemblies in accordance with some embodiments of the present invention may have a center member lacking fastener apertures but instead supported below by one or more securing members (similar to that as illustrated by accessory assembly 320 of FIG. 19). It is further to be appreciated that, analogous to some raptor perch systems discussed herein, hub bracket 522 may include a plurality of lateral support brackets (analogous to that as illustrated by brackets 26 as illustrated in FIG. 2).

Referring now to the exemplary illustrations of FIG. 25, in some implementations hub bracket 522 may engage extension bayonet 244. Raptor perch system 211 may include raptor perch assembly 210 having hub bracket 222. Hub bracket 222 may include center member 224 having one or more apertures through which fasteners 225 may extend. As discussed above with reference to exemplary raptor perch systems, center member 224 may engage a distal (or top) end of extension bayonet. Fasteners 225 may transversely extend through extension bayonet 244 to secure raptor perch system 211 to the extension bayonet 244. The fasteners may include bolts, cotter pins, and other known fastening devices. Raptor perch assembly 210 may further include lateral support members 228 extending from hub bracket 222 forming a platform upon which raptors may perch. Attaching members 236 may be provided on distal ends of lateral support members 228 (directly or indirectly through end caps on distal ends of lateral support members 228).

Similarly, deflecting system 511 may include deflecting assembly 510 having hub bracket 522. Hub bracket 522 may include center member 524 having one or more apertures (such as aperture 527 illustrated in FIG. 23) through which fasteners 525 may extend. Center member 524 may engage an upper portion of extension bayonet. Fasteners 525 may transversely extend through extension bayonet 544 to secure deflecting system 511 to the extension bayonet 244. The fasteners may include bolts, cotter pins, and other known fastening devices. Deflecting assembly 510 may further include lateral support members 528 extending from hub bracket 522 forming a support for one or more deflector panels 561. Attaching members 536 may be provided on distal ends of lateral support members 528 (directly or indirectly through end caps on distal ends of lateral support members 528). In some examples vertical support members 538 may be attached to attaching members 536 and 236 for vertically supporting distal ends of lateral support members 528.

In some other implementations, the deflecting assembly hub bracket may engage the hub bracket of the raptor perch assembly such that a common fastener may engage both the raptor perch assembly and the deflecting assembly to a distal (or top) end of the extension bayonet. Referring now to the example of FIG. 26, hub bracket 542 of deflecting system 512 may have a size that is larger relative to hub bracket 522 (of FIG. 25) and/or hub bracket 222 of raptor perch system 211.

Hub bracket 542 may have center member 544 with an internal dimension that is greater than an outside wall of center member 224 of hub bracket 222, such that it may circumferentially surround a portion of center member 224. Fastener 545 may be inserted through an aperture in center member 544 (similar to aperture 527 of center member 524 as illustrated in FIG. 23) and an aperture in center member 224 (similar to aperture 27 in center member 24 as illustrated in FIG. 3). Fastener 545 may transversely extend through extension bayonet 244 thus securing both raptor perch system 211 and deflecting system 512 to extension bayonet.

It is to be appreciated that the present invention thusly provides systems that are quick and easy to install on top of existing power poles and which enable places for raptors to perch, attachment of accessories above the power line, and/or deflecting means protecting the accessories and/or power line.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is to be appreciated that while the forgoing discussion may identify one or dimensional relationships, orientations, materials, sizes, shapes, uses, and the like, these are simply to illustrate the invention, and may be modified or replaced with alternative components, relationships, or orientations to accomplish the objectives of the invention. Similarly, it is to be appreciated those other combinations of elements and/or features are contemplated in accordance with some embodiments of the present invention. For example, and without limitation, some embodiments of the invention include raptor perch systems, alone or in combination with one or more accessories and/or deflection systems.

It is intended that the scope of the invention be defined by the claims appended hereto and their equivalents. The use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

What is claimed is:

1. A system comprising:
    a) a pole supporting a power line;
    b) an extension bracket assembly for engaging a distal end of said pole;
    c) an extension bayonet having a proximal end engaged with said bracket assembly;
    d) a perch assembly having a hub bracket and at least one lateral support member extending outwardly from said hub bracket, said hub bracket having a center member engaged with a distal end of said extension bayonet; and
    e) an accessory assembly engaged to said extension bayonet between said perch assembly and said extension bracket assembly.

2. The system of claim 1, said accessory assembly comprising a center member, said center member having a center cavity receiving said extension bayonet.

3. The system of claim 2, said center member completely circumscribing said extension bayonet.

4. The system of claim 1, said accessory assembly comprising at least one radially extending arm for engagement to an accessory.

5. The system of claim 1, said perch assembly hub bracket further comprising a plurality of support brackets, said perch assembly further comprising a plurality of lateral support members, each said lateral support members having a proximal end for engaging one of said support brackets and extending outwardly therefrom.

6. The system of claim 1, further comprising at least one wire for engaging distal ends of each of said lateral support members of said perch assembly.

7. The system of claim 1, further comprising a plurality of cap members, each said cap member for engaging a distal end of one of said lateral support members of said perch assembly.

8. The system of claim 1, further comprising a deflecting assembly having a hub bracket and at least one deflector panel extending outwardly from said hub bracket, said deflecting assembly between said perch assembly and said accessory assembly.

9. The system of claim 8, said deflecting assembly hub bracket comprising a center member having a center cavity receiving said extension bayonet.

10. The system of claim 9, said deflecting assembly center member having at least one aperture, said deflecting assembly further comprising at least one fastener transversely extending through said extension bayonet and said at least one deflecting assembly center member aperture, for securing said deflecting assembly center member to said extension bayonet.

11. The system of claim 9, said deflecting assembly further comprising at least one lateral support member extending outwardly from said deflecting assembly hub bracket.

12. The system of claim 8, said deflecting assembly hub bracket comprising a center member having a center cavity receiving a portion of said perch assembly hub bracket.

13. The system of claim 12, each said perch assembly center member and said deflecting assembly center member having an aperture, said system further comprising at a fastener transversely extending through said deflecting assembly center member aperture, said perch assembly center member aperture, and said extension bayonet, for securing said deflecting assembly center member and said perch assembly center member to said extension bayonet.

14. The system of claim 8, said deflecting assembly further comprising at least one vertical support member engaged to said perch assembly.

15. A raptor perch system comprising:
    a) a pole supporting at least one power line;
    b) an extension bracket assembly for engaging a distal end of said pole;
    c) an extension bayonet having a proximal end for engaging said bracket assembly;

d) a raptor perch assembly having a hub bracket for engaging a distal end of said extension bayonet and at least one lateral support member extending outwardly from said hub bracket; and e) a deflecting assembly having a hub bracket and at least one deflector panel extending outwardly from said hub bracket.

16. The raptor perch system of claim 15, said deflecting assembly hub bracket engaged with said extension bayonet.

17. The raptor perch system of claim 16, said deflecting assembly hub bracket comprising a center member having a center cavity receiving said extension bayonet.

18. The raptor perch system of claim 17, said deflecting assembly center member having at least one aperture, said deflecting assembly further comprising at least one fastener for transversely extending through said extension bayonet and said at least one deflecting assembly center member aperture.

19. The raptor perch system of claim 15, said deflecting assembly hub bracket engaged with said raptor perch assembly hub bracket.

20. The raptor perch system of claim 19, said raptor perch assembly hub bracket comprising a center member having a center cavity receiving said extension bayonet.

21. The raptor perch system of claim 20, said deflecting assembly hub bracket comprising a center member having a center cavity, wherein said center cavity of said deflecting assembly center member has an internal diameter that is greater than an internal diameter of said raptor perch assembly center member.

22. The raptor perch system of claim 21, each said deflecting assembly center member and said raptor perch assembly center member having an aperture.

23. The raptor perch system of claim 22, further comprising at least one fastener for transversely extending through said deflecting assembly center member aperture, said raptor perch assembly center member aperture, and said extension bayonet.

24. The raptor perch system of claim 15, said deflecting assembly between said raptor perch assembly and said extension bracket.

25. The raptor perch system of claim 15, said deflecting assembly further comprising a plurality of lateral support members.

26. The raptor perch system of claim 25, said deflecting assembly further comprising at least one vertical support member engaged to at least one of said deflecting assembly lateral support members and at least one of said raptor perch assembly lateral support members.

27. The raptor perch system of claim 26, each of said deflecting assembly lateral support members and said raptor perch assembly lateral support members comprising attaching members on distal ends thereof.

28. The raptor perch system of claim 27, each said attaching members comprising a ring, said vertical support member comprising a wire.

29. The raptor perch system of claim 15, said raptor perch assembly further comprising at least one wire for engaging distal ends of each of said at least one lateral support member.

30. A system comprising:
a) a pole supporting at least one power line;
b) an extension bracket assembly having a collar and at least two bracket members, each said bracket member having a leg portion extending circumferentially partially around a distal end of said pole;
c) an extension bayonet having a proximal end engaging said collar of said bracket assembly;

d) a raptor perch assembly having (i) a hub bracket engaging a distal end of said extension bayonet, (ii) a plurality of lateral support members extending outwardly from said hub bracket, and (iii) at least one distal support member engaged with distal ends of each of said lateral support members;

e) a deflecting assembly having (i) a hub bracket, (ii) a plurality of lateral support members extending outwardly from said hub bracket, and (iii) a plurality of vertical support members, each said vertical support member engaged with one of said lateral support members, and (iv) at least one deflector panel extending outwardly from said hub bracket and engaged with at least one of said lateral support members; and f) an accessory assembly having a hub bracket engaged to said extension bayonet, wherein said accessory assembly is between said extension bracket and said raptor perch assembly, wherein said deflecting assembly is between said accessory assembly and said raptor perch assembly.

31. The system of claim 30, wherein said deflecting assembly hub bracket is engaged to said extension bayonet.

32. The system of claim 30, wherein said deflecting assembly hub bracket is engaged to said raptor perch assembly hub bracket.

33. The system of claim 30, each said deflecting assembly vertical support member further engaging one of said raptor perch assembly lateral support members.

34. The system of claim 30, each said deflecting assembly vertical support member further engaging one of said raptor perch assembly distal support members.

35. A system for use with a pole comprising:
a) an extension bracket assembly for engaging a distal end of said pole;
b) an extension bayonet having a proximal end engaged with said bracket assembly;
c) a perch assembly having a hub bracket and at least one lateral support member extending outwardly from said hub bracket, said hub bracket having a center member engaged with a distal end of said extension bayonet; and
d) an accessory assembly engaged to said extension bayonet between said perch assembly and said extension bracket assembly, said accessory assembly comprising:
I) a center member having a center cavity receiving said extension bayonet and an aperture, and
II) a fastener for securing said accessory assembly center member to said extension bayonet, said fastener transversely extending through said extension bayonet and said center member aperture.

36. The system of claim 35, said accessory assembly center member further comprising a plurality of apertures and said accessory assembly further comprising a plurality of fasteners.

37. A system for use with a pole comprising:
a) an extension bracket assembly for engaging a distal end of said pole;
b) an extension bayonet having a proximal end engaged with said bracket assembly;
c) a perch assembly having a hub bracket and at least one lateral support member extending outwardly from said hub bracket, said hub bracket having a center member engaged with a distal end of said extension bayonet; and
d) an accessory assembly engaged to said extension bayonet between said perch assembly and said extension bracket assembly, said accessory assembly comprising:
I) a center member having a center cavity receiving said extension bayonet, and II) at least one securing member, each said securing member having a center cavity receiving said extension bayonet and positioned adjacent to said accessory assembly center member.

38. The system of claim 37, said accessory assembly securing member having an aperture, said accessory assembly further comprising a fastener for securing said accessory assembly securing member to said extension bayonet, said fastener transversely extending through said extension bayonet and said accessory assembly securing member aperture.

39. The system of claim 38, said accessory assembly securing member further comprising a plurality of apertures and said accessory assembly further comprising a plurality of fasteners.

40. A system for use with a pole comprising:
   a) an extension bracket assembly for engaging a distal end of said pole;
   b) an extension bayonet having a proximal end engaged with said bracket assembly;
   c) a perch assembly having a hub bracket and at least one lateral support member extending outwardly from said hub bracket, said hub bracket having a center member engaged with a distal end of said extension bayonet; and
   d) an accessory assembly engaged to said extension bayonet between said perch assembly and said extension bracket assembly, said accessory assembly comprising:
      I) a center member having an inner member having a center cavity receiving said extension bayonet, and an outer member surrounding at least a portion of said inner member.

41. The system of claim 40, said center member inner member having an aperture, said accessory assembly further comprising a fastener for securing said inner member to said extension bayonet, said fastener transversely extending through said extension bayonet and said inner member aperture.

42. The system of claim 41, wherein said outer member is rotatable relative to said inner member.

43. The system of claim 41, said inner member further comprising a plurality of apertures and said accessory assembly further comprising a plurality of fasteners.

44. The system of claim 40, said inner member comprising a plurality of portions, each said portion having an inner flat surface for abuttingly engaging a side of said extension bayonet, and a rounded outer surface.

45. The system of claim 44, said outer member comprising a plurality of portions, each said portion having an inner rounded surface for abuttingly engaging said rounded outer surface of at least one of said inner member portions.

* * * * *